(12) United States Patent
Ryder et al.

(10) Patent No.: US 12,063,393 B2
(45) Date of Patent: Aug. 13, 2024

(54) METHOD FOR MEDIA STREAM PROCESSING AND APPARATUS FOR IMPLEMENTING THE SAME

(71) Applicant: ANEVIA, Vélizy (FR)

(72) Inventors: Benoît Ryder, Vélizy (FR); Tanguy Person, Vélizy (FR)

(73) Assignee: ATEME, Vélizy-villacoublay (FR)

( * ) Notice: Subject to any disclaimer, the term of this patent is extended or adjusted under 35 U.S.C. 154(b) by 0 days.

(21) Appl. No.: 17/541,623

(22) Filed: Dec. 3, 2021

(65) Prior Publication Data
US 2022/0182690 A1  Jun. 9, 2022

(30) Foreign Application Priority Data

Dec. 3, 2020 (EP) ..................................... 20306489

(51) Int. Cl.
*H04N 21/218* (2011.01)
*H04N 21/2187* (2011.01)
*H04N 21/231* (2011.01)
*H04N 21/232* (2011.01)
*H04N 21/235* (2011.01)
*H04N 21/2389* (2011.01)
*H04N 21/239* (2011.01)
*H04N 21/462* (2011.01)
*H04N 21/643* (2011.01)
*H04N 21/845* (2011.01)
*H04N 21/854* (2011.01)

(52) U.S. Cl.
CPC ..... *H04N 21/23113* (2013.01); *H04N 21/235* (2013.01); *H04N 21/2393* (2013.01)

(58) Field of Classification Search
CPC .................................................. H04N 21/2393
See application file for complete search history.

(56) References Cited

U.S. PATENT DOCUMENTS

| 10,820,022 | B1 | 10/2020 | Weil et al. |
| 2013/0132507 | A1 | 5/2013 | Swaminathan et al. |
| 2017/0111665 | A1 | 4/2017 | Suryanarayanan et al. |

(Continued)

OTHER PUBLICATIONS

Extended EP Search Report for EP20306489.4 dated May 4, 2021, 14 pages.

(Continued)

*Primary Examiner* — Hsiungfei Peng
(74) *Attorney, Agent, or Firm* — NIXON & VANDERHYE

(57) ABSTRACT

A method for processing a media stream is proposed, which includes, at a media distribution unit including a processor: obtaining, based on media stream data received from a media encoder, at least one media data chunk of the media stream, wherein the at least one media data chunk is a separately addressable data unit by a request for media data received by the media distribution unit; generating, based on received media stream data, metadata related to the media data chunk; storing the media data chunk in a memory of the media distribution unit, wherein the memory is used to store media data chunks as separately addressable data units for a memory read from the memory; and updating a list of media data chunks stored in the memory, based on the metadata related to the media data chunk.

16 Claims, 7 Drawing Sheets

(56) References Cited

U.S. PATENT DOCUMENTS

2018/0288500 A1 10/2018 Stockhammer
2020/0037014 A1* 1/2020 Dahl .................... H04N 21/632
2020/0112753 A1* 4/2020 Stockhammer .. H04N 21/23439

OTHER PUBLICATIONS

"WD of ISO/IEC 23000-19 $2^{nd}$ Edition CMAF", 125.MPEG Meeting, Jan. 22, 2019, 150 pages.
T. Stockhammer, "DASH and CMAF: Referencing Common Segment Fromats", 117.MPEG Meeting, Jan. 12, 2017, 11 pages.
R. Mekuria, "Use Case for Event Message Track Format", 132. MPEG Meeting, Aug. 28, 2020, 7 pages.
A. Wagenaar et al., "Unified Streaming Response to NBMP", 123.MPEG Meeting, Jul. 11, 2018, 36 pages.
"WD of ISO/IEC TR 23009-7 Delivery of CMAF contents with DASH", 123.MPEG Meeting, Jul. 20, 2018, 23 pages.

* cited by examiner

METHOD FOR MEDIA STREAM PROCESSING AND APPARATUS FOR IMPLEMENTING THE SAME

CROSS-REFERENCE TO RELATED APPLICATIONS

This application claims priority benefit under 35 U.S.C. § 119(d) from European Patent Application No. 20 306 489.4, filed Dec. 3, 2020, the disclosure of which is incorporated by reference herein in its entirety.

BACKGROUND OF THE INVENTION

Field of the Invention

The present disclosure relates to the field of media distribution, and more particularly to video distribution, for example in an Over The Top (OTT) network.

Description of the Related Art

Broadcast television has significantly transformed over the recent years. New audiovisual services, sometimes referred to as "non-linear services", such as Video On Demand (VOD), Catch-Up TV or Replay, have emerged, on top of traditional dynamic mode broadcasting of so-called "linear" or "live" TV services (Asymmetric Digital Subscriber Line (ADSL), Satellite, Cable, IPTV, Fiber, DVB), via operators such as cable operator or Internet triple-play providers.

On the other hand, the development of new terminals with increased computation capabilities, the ever-growing demand for playing multimedia contents regardless on the location of the end-user terminal (TV everywhere), as well as the development of network infrastructures offering ever-increasing bandwidth to their end-users have fostered the emergence of a new multimedia distribution market, referred to as Over-The-Top (OTT), which does not require its operators to own their access network towards end users. The OTT market operates on non-managed networks to provide multi-screen services through traditional broadcasters such as TV operators or telecom operators.

TV broadcasting workflows typically comprise a so-called "packaging" function, which is used to receive TV channels carrying data related to multimedia contents from source encoders and package the received data into suitable protocol data for distribution to end-user terminals, for example through a Content Distribution Network (CDN). While conventional packaging schemes package the data upon reception and prepares such data for distribution according to one or more distribution protocols, so called "just-in-time," or "on-the-fly" packaging schemes have been developed in order to more efficiently implement live services as well as non-linear services.

Meanwhile, distribution protocols have been improved through the emergence of a low latency version of most distribution protocols in order to reduce the end-to-end latency involved in multimedia distribution, such as, for example, OTT distribution.

There is therefore a need for providing an improved packaging scheme that leverages low latency distribution protocols while supporting both live and just-in-time packaging.

There is also a need for providing an improved media stream processing scheme and system and apparatuses implementing the same that address at least some of the above-described drawbacks and shortcomings of the conventional technology in the art.

It is an object of the present subject disclosure to provide an improved method for processing a media (e.g. video) stream and system and apparatuses implementing the same that address at least some of the above-described drawbacks and shortcomings of the conventional technology in the art.

SUMMARY OF THE INVENTION

To achieve these objects and other advantages and in accordance with the purpose of the present subject disclosure, as embodied and broadly described herein, in one aspect of the present subject disclosure, a method for processing a media stream is proposed, which comprises, at a media distribution unit comprising a processor, obtaining, based on media stream data received from a media encoder, at least one media data chunk of the media stream, wherein the at least one media data chunk is a separately addressable media data object by a request for media data received by the media distribution unit; generating, based on received media stream data, metadata related to the media data chunk; storing the media data chunk in a memory of the media distribution unit, wherein the memory is configured to store media data chunks as separately addressable media data objects for a memory read from the memory; and updating a list of media data chunks stored in the memory, based on the metadata related to the media data chunk.

The proposed method advantageously introduces the use of a memory configured for storing media data chunks at a media distribution unit configured for receiving media stream supporting low latency. The use of such memory allows leveraging the advantages of low latency in the processing of the received media stream, for instance when serving a request for media data which is directed to media data chunks. The requested chunks can be directly retrieved from the memory configured for storing chunks, which reduces latency, as compared to retrieving media data from a conventional memory for storing media data which would store media data in fragments, as opposed to chunks. Low latency support can therefore be improved through the proposed memory configured for storing chunks instead of larger data units such as fragments.

In some embodiments, the proposed method may further comprise: generating, by the media distribution unit, the at least one media data chunk based on the media stream data. In such cases, the media distribution unit may be configured for generating chunks based on the received media stream data. Alternatively, the media distribution unit may parse the chunks from the received media stream, based on metadata related to the chunks embedded in the media stream that may be comprised in the received media stream data.

In some embodiments, the at least one media data chunk may be comprised in a media data fragment of the media stream, and the metadata may comprise information on the media data fragment to which the media data chunk belongs. In such embodiments, the proposed method may further comprise: based on the information on the media data fragment to which the media data chunk belongs indicating that the media data chunk is a first chunk of the media data fragment, storing the media data chunk in the memory in the form of a fragment file containing the media data chunk.

In some embodiments, the proposed method may further comprise: based on the information on the media data fragment not indicating that the media data chunk is the first chunk of the media data fragment, storing the media data chunk in the memory in the fragment file corresponding to the media data fragment.

In some embodiments, the metadata may comprise a timestamp for the media data chunk, and the proposed method may further comprise: determining, based on the timestamp, whether the media data chunk was stored in the memory for a time period exceeding a predetermined duration, and based on the determination, deleting the media data chunk from the memory, and updating the list of media data chunks by deleting from the list the metadata related to the media data chunk.

In some embodiments, the metadata may comprise a timestamp for the media data chunk, and the proposed method may further comprise: determining, based on the timestamp, whether the media data fragment was stored in the memory for a time period exceeding a predetermined duration; and based on the determination, deleting from the memory each of one or more media data chunks belonging to the media data fragment, and updating the list of media data chunks by deleting from the list metadata related to each of the one or more media data chunks belonging to the media data fragment.

Depending on the embodiment, the media data chunk may comprise an audio chunk, a video chunk, and/or a text chunk.

In some embodiments, the proposed method may further comprise: receiving a request for transmission of the media data chunk from an output unit of the media distribution unit configured for outputting media data in response to a request related to media data received by the media distribution unit.

In some embodiments, the proposed method may further comprise: further to updating the list, transmitting to an output unit of the media distribution unit a message informing the output unit that the media data chunk is stored in the memory.

In some embodiments, the media data chunk may be a Common Media Application Format, CMAF chunk.

In some embodiments, the memory may be a short-term memory, wherein the short-term memory is dimensioned for storing media data corresponding to a predetermined capacity feature. In some embodiments, the capacity feature is a storage size and/or a time corresponding to duration of media data stored in the memory.

In some embodiments, the memory may be a Random Access Memory, RAM, memory and/or a flash-based memory.

The proposed method may advantageously be used in a media distribution unit, such as a media packager, incorporated in a media distribution chain supporting chunk encoding and transfer from end to end, thereby fully leveraging low latency media distribution mechanisms.

By using a media memory configured for storing media data at the chunk granularity, the proposed method may advantageously be implemented in a media distribution unit, such as a media packager, that is capable of processing live video streams provided by live sources, while fully operating at the chunk granularity to provide low latency video stream processing. Using such a memory at chunk level granularity may be particularly advantageous in embodiments where a media data chunk may be a data unit separately addressable in a request related to media data received by the media distribution unit. Such a media unit will be configured for receiving and processing requests for media data that may be expressed in chunk units (e.g. a request for one or more chunks of the processed media stream). As a consequence, using a memory for media data that is configured for being used at the chunk level granularity will decrease the processing time of handling requests for chunks.

A proposed media distribution unit configured for implementing the proposed method may therefore use a memory configured for storing media data at the chunk granularity (sometimes referred to in the following as a "first memory") as proposed in the present subject disclosure, and a memory configured for storing media data at the fragment granularity (sometimes referred to in the following as a "second memory"), a fragment being a media unit which comprises one or more chunks. As a consequence, the first memory may be configured to store data at a finer granularity level than the second memory.

In another aspect of the present subject disclosure, a method for processing a media stream for managing stored media data is proposed, which comprises, at a media distribution unit comprising a processor and first and second memories for storing media data, the first memory being configured to store one or more media data chunks of the media stream which are separately addressable data objects for memory read in the first memory, and the second memory being configured to store one or more media data fragments of the media stream which are separately addressable data objects for memory read in the second memory, the one or more media data fragments respectively comprising one or mode media data chunks: selecting a media data chunk stored in the first memory; obtaining, based on metadata related to the media data chunk, metadata related to a media data fragment comprising the selected media data chunk; and storing in the second memory media data of the media data chunk as media data of the media data fragment.

In some embodiments, the proposed method for processing a media stream for managing stored media data may further comprise: generating the media data fragment, and storing the media data fragment in the second memory.

In some embodiments, the proposed method for processing a media stream for managing stored media data may further comprise: obtaining, based on received media stream data, at least one media data chunk of the media stream, wherein the at least one media data chunk is a separately addressable data unit by a request for media data received by the media distribution unit; and storing the media data chunk in the first memory of the media distribution unit, wherein the memory is configured to store media data chunks as separately addressable data units for a memory read from the memory.

In some embodiments, the proposed method for processing a media stream for managing stored media data may further comprise: obtaining, based on received media stream data, the metadata related to the media data chunk.

In some embodiments, the proposed method for processing a media stream for managing stored media data may further comprise: deleting the media data chunk from the first memory once the media data fragment is stored in the second memory.

In some embodiments, the proposed method for processing a media stream for managing stored media data may further comprise: receiving media stream data comprising a sequence of media data chunks and metadata related to chunks of the sequence, each media data chunk belonging to a fragment in a sequence of fragments comprised in the media stream data, wherein the metadata related to the media data chunk comprise information as to whether or not the media data chunk is the first chunk of a fragment.

In some embodiments, the metadata related to the media data chunk may comprise a timestamp associated with the media data chunk and data representing a duration of the media data chunk, and the proposed method may further comprise: determining the metadata related to the media data fragment, wherein the metadata related to the media data fragment comprises a timestamp related to the first chunk of the media data fragment, and data representing a duration of the media data fragment. In such embodiments, the metadata related to the media data chunk comprises information on a media data fragment to which the media data chunk belongs.

In some embodiments, the proposed method for processing a media stream for managing stored media data may further comprise: selecting a plurality of media data chunks stored in the first memory; and generating the metadata related to the media data fragment based on metadata related to each of the selected media data chunks.

In some embodiments, the proposed method for processing a media stream for managing stored media data may further comprise: updating, based on the media data fragment, a list of media data fragments stored in the second memory, wherein the list of media data fragments stored in the second memory is used to serve requests related to media data received by the media distribution unit.

In some embodiments, the proposed method for processing a media stream for managing stored media data may further comprise: upon deletion of the media data chunk from the first memory, updating, based on the media data chunk, a list of media data chunks stored in the first memory, wherein the list of media data chunks stored in the first memory is used to serve requests related to media data received by the media distribution unit.

In some embodiments, the media data chunk may comprise one or more of an audio chunk, a video chunk, and/or a text chunk, and the media data fragment comprise one or more of an audio fragment, a video fragment, and/or a text fragment.

In some embodiments, the request related to media data may comprise a request for media data metadata and/or a request for media data.

In some embodiments, the media data chunk may be a Common Media Application Format, CMAF, chunk. In some embodiments, the media data fragment may be a CMAF fragment.

In yet another aspect of the present subject disclosure, an apparatus is proposed, which comprises a processor, and a memory operatively coupled to the processor, wherein the apparatus is configured to perform a method as proposed in the present subject disclosure.

In yet another aspect of the present subject disclosure, a media distribution system configured to distribute video streams is proposed, which comprises an apparatus as proposed in the present subject disclosure, the apparatus being configured to process video streams received by the system.

In yet another aspect of the present subject disclosure, a non-transitory computer-readable medium encoded with executable instructions which, when executed, causes an apparatus comprising a processor operatively coupled with a memory, to perform a method as proposed in the present subject disclosure, is proposed.

For example, in some embodiments, the present subject disclosure provides a non-transitory computer-readable medium encoded with executable instructions which, when executed, causes an apparatus comprising a processor operatively coupled with a memory, to perform a method for processing a media stream as proposed, which comprises, at a media distribution unit comprising a processor: obtaining, by the processor, based on media stream data received from a media encoder, at least one media data chunk of the media stream, wherein the at least one media data chunk is a separately addressable media data object by a request for media data received by the media distribution unit; generating, by the processor, based on received media stream data, metadata related to the media data chunk; storing, by the processor, the media data chunk in a memory of the media distribution unit, wherein the memory is configured to store media data chunks as separately addressable media data objects for a memory read from the memory; and updating, by the processor, a list of media data chunks stored in the memory, based on the metadata related to the media data chunk.

As another example, in some embodiments, the present subject disclosure provides a non-transitory computer-readable medium encoded with executable instructions which, when executed, causes an apparatus comprising a processor operatively coupled with a memory, to perform a method for processing a media stream for managing stored media data as proposed, which comprises, at a media distribution unit comprising a processor and first and second memories for storing media data, the first memory being configured to store one or more media data chunks of the media stream which are separately addressable data objects for memory read in the first memory, and the second memory being configured to store one or more media data fragments of the media stream which are separately addressable data objects for memory read in the second memory, the one or more media data fragments respectively comprising one or mode media data chunks: selecting, by the processor, a media data chunk stored in the first memory; obtaining, by the processor, based on metadata related to the media data chunk, metadata related to a media data fragment comprising the selected media data chunk; and storing, by the processor, in the second memory media data of the media data chunk as media data of the media data fragment In yet another aspect of the present subject disclosure, a computer program product comprising computer program code tangibly embodied in a computer readable medium, said computer program code comprising instructions to, when provided to a computer system and executed, cause said computer to perform a method as proposed in the present subject disclosure, is proposed.

In another aspect of the present subject disclosure, a data set representing, for example through compression or encoding, a computer program as proposed herein, is proposed.

It should be appreciated that the present disclosure can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which.

DESCRIPTION OF THE PREFERRED EMBODIMENTS

Figure 1:
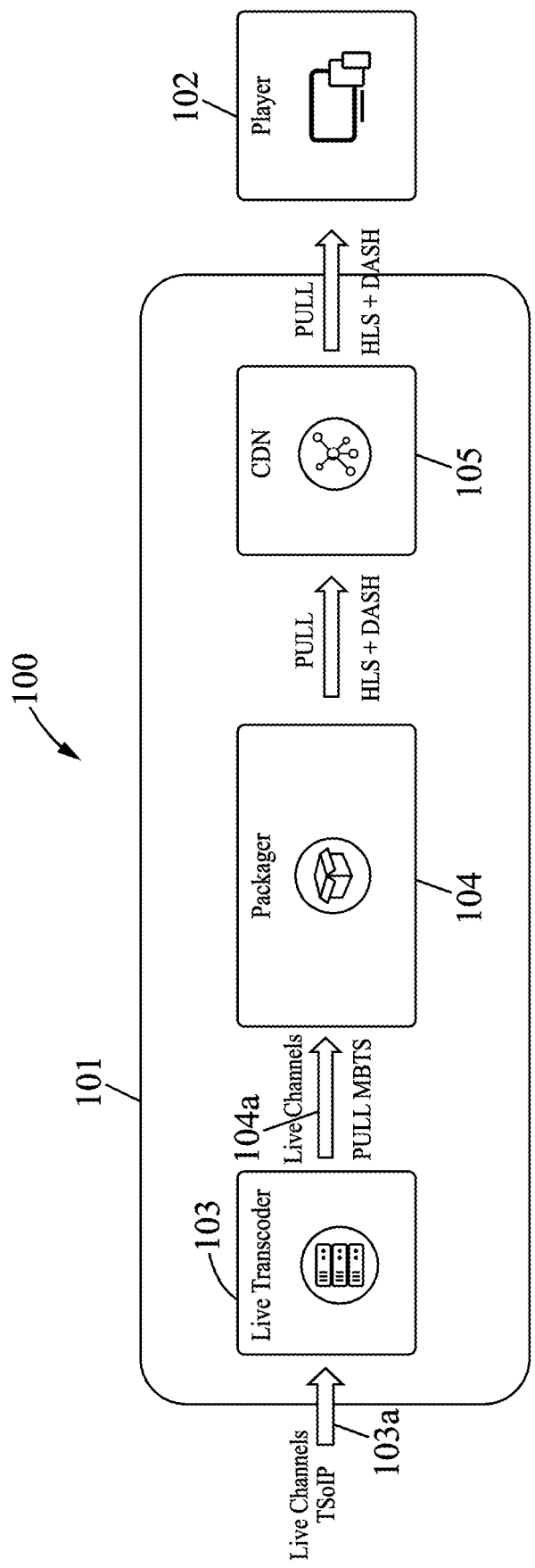
FIG. 1 is a block diagram illustrating an exemplary video distribution system in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments of the disclosure. Additionally, elements in the drawing figures are not necessarily drawn to scale. For example, the dimensions of some of the elements in the figures may be exaggerated relative to other elements to help improve understanding of embodiments of the present disclosure. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to units, functions, engines, subsystems, block diagrams and flowchart illustrations of the methods, systems, and computer program according to one or more exemplary embodiments. Each described unit, function, engine, block, subsystem of the block diagrams and flowchart illustrations can be implemented in hardware, software, firmware, middleware, microcode, or any suitable combination thereof. If implemented in software, the units, functions, engines, blocks, subsystems of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the units, functions, engines, subsystems, blocks of the block diagrams and/or flowchart illustrations described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms "memory" and "computer storage media" include any type of data storage device, such as, without limitation, a hard drive, a flash drive or other flash memory devices (e.g. memory keys, memory sticks, key drive), CD-ROMs or other optical data storage devices, DVDs, magnetic disk data storage devices or other magnetic data storage devices, data memory components, RAM, ROM and EEPROM memories, memory cards (smart cards), solid state drive (SSD) memories, and any other form of medium able to be used to transport or store or memorize data or data structures able to be read by a computer processor, or a combination thereof. Furthermore, various forms of computer-readable media may transmit or carry instructions to a computer, such as a router, a gateway, a server, or any data transmission equipment, whether this involves wired transmission (via coaxial cable, optical fibre, telephone wires, DSL cable or Ethernet cable), wireless transmission (via infrared, radio, cellular, microwaves) or virtualized transmission equipment (virtual router, virtual gateway, virtual tunnel end, virtual firewall). According to the embodiments, the instructions may comprise code in any computer programming language or computer program element, such as, without limitation, the languages of assembler, C, C++, Visual Basic, HyperText Markup Language (HTML), Extensible Markup Language (XML), HyperText Transfer Protocol (HTTP), PHP Hypertext Preprocessor (PHP), SQL, MySQL, Java, JavaScript, JavaScript Object Notation (JSON), Python, and bash scripting.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs. The terms "in particular", "for example", "example", "typically" are used in the present description to denote examples or illustrations of non-limiting embodiments that do not necessarily correspond to preferred or advantageous embodiments with respect to other possible aspects or embodiments.

The terms "operationally coupled", "coupled", "mounted", "connected" and their various variants and forms used in the present description refer to couplings, connections and mountings that may be direct or indirect, and comprise in particular connections between electronic equipment or between portions of such equipment that allow operations and modes of operation as described in the present description. In addition, the terms "connected" and "coupled" are not limited to physical or mechanical connections or couplings. For example, an operational coupling may include one or more wired connection(s) and/or one or more wireless connection(s) between two or more items of equipment that allow simplex and/or duplex communication links between the equipment or portions of the equipment. According to another example, an operational coupling or a connection may include a wired-link and/or wireless coupling for allowing data communications between a server of the proposed system and another item of equipment of the system.

"Server" or "platform" in the present subject disclosure means any (virtualized or non-virtualized) point of service or computer device or system performing data processing operations, one or more databases, and/or data communication functions. For example, and without limitation, the term "server" or the term "platform" may refer to a physical processor operationally coupled to associated communication, database and data storage functions, or refer to a network, a group, a set or a complex of processors and associated data storage and networking equipment, and to an operating system and one or more database system(s) and application software supporting the services and functions provided by the server. A server or platform may be configured to operate in or as part of a cloud computing environment. A computer device or system may be configured so as to send and receive signals, via wireless and/or wired transmission networks(s), or be configured so as to process and/or store data or signals, and may therefore operate as a server. Equipment configured so as to operate as a server may thus include, by way of non-limiting example, dedicated servers mounted on a rack, cloud-based servers, desktop computers, laptop computers, service gateways (sometimes called "box" or "home gateway"), multimedia decoders (sometimes called "set-top boxes"), integrated equipment combining various functionalities, such as two or more of the abovementioned functionalities. The servers may vary greatly in terms of their configuration or their capabilities, but a server will generally include one or more central processing unit(s) and a memory. A server may also include one or more item(s) of mass memory equipment, one or more electric power supply/supplies, one or more wireless and/or wired network interface(s), one or more input/output interface(s), one or more operating system(s), such as Windows Server, Mac OS X, Unix, Linux, FreeBSD, or an equivalent.

The terms "application" or "application program" (AP) and their variants ("app", "web app", etc.) as used in the present description correspond to any tool that operates and is operated by way of a computer in order to provide or execute one or more function(s) or task(s) for a user or another application program. In order to interact with an application program and control it, a user interface may be provided on the equipment on which the application program is implemented. For example, a graphical user interface (or GUI) may be generated and displayed on a screen of the user equipment, or an audio user interface may be played back to the user using a speaker, a headset or an audio output.

The terms "media data", "media content", "multimedia data", and "multimedia content" as used interchangeably in the present description correspond to any audio, video, and/or text, or audiovisual data content, with or without closed captions, open captions, subtitles, timed text or visual descriptors.

Figure 3:
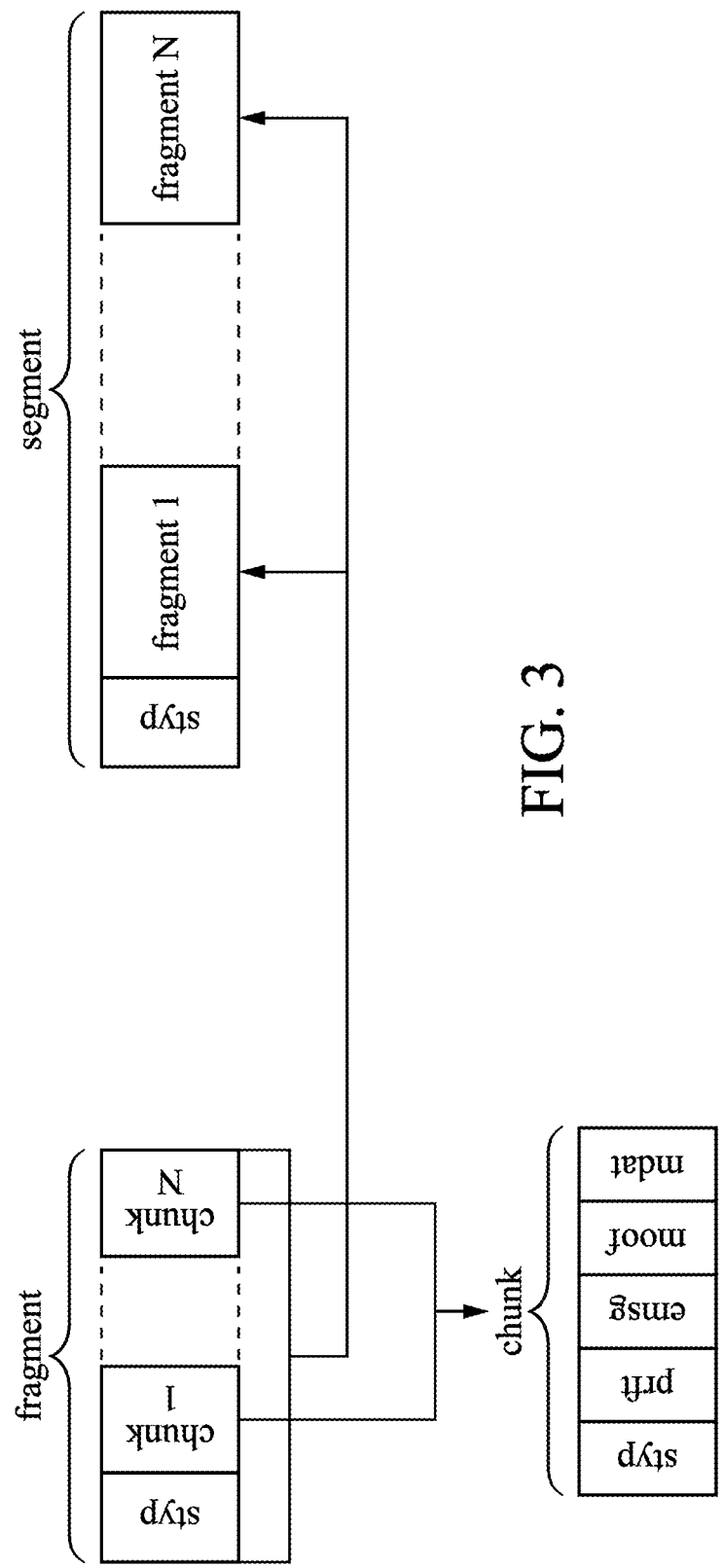
FIG. 3 illustrates an exemplary CMAF segment structure that may be used in one or more embodiments.

In the present description, the terms "media object" or "media data object" as used interchangeably in the present description correspond to any data unit, data packet, or data set comprising media data and/or metadata (in particular metadata related to media data). For example, a media stream may be segmented into various media objects, such as media data chunks (for a stream supporting low latency), media data fragments, and media data segments. According to example embodiments of the present disclosure, chunks, fragments, and segments may be examples of media objects carrying media data and metadata related thereto. A hierarchical structure may in some embodiments be used, for example according to which chunks may be smaller media objects than fragments and segments, and a fragment may contain one or more chunks, while a segment may contain one or more fragments. In some embodiments, the chunks may correspond to the smallest used media object, in that it may not contain any other media objects. In the context of low latency, chunks may correspond to the smallest media object addressable by a request related to media data. That is, a request related to media data may request one or more chunks, and chunks may be the smallest media objects that may be requested through a request for media data. For example, a request for media data may request one or more segments, each segment being a larger media object than a chunk in that it may contain one or more chunks. For example, the segments, fragments, and/or chunks that are used in one or more embodiments may have a hierarchical structure as illustrated by FIG. 3 for the specific case of CMAF segments, CMAF fragments, and CMAF chunks.

In the present description, the terms "real-time" distribution, distribution "in linear mode", distribution "in linear TV mode", distribution "in dynamic mode" and "live" distribution or distribution "in live mode" are used interchangeably to denote the distribution in live mode or dynamic mode of multimedia content in a content distribution system to terminals, comprising in particular the distribution of the content as it is generated.

In the present description, the terms "non-linear", "non-linear TV", "non-linear TV mode", "non-linear TV services", "non-linear services", "static distribution", and "distribution in static mode" are used interchangeably to denote the distribution, upon and subject to an access request from a user, of previously generated content, such as for example content recorded on a server and made available to users by a video on demand (VOD) service, a PauseTV service, a Start-Over service, a CatchUp-TV service, a Replay service or a CloudDVR service.

In the present description, the terms "real-time" are also used in the context of video encoding or compressing video content, to denote the encoding or compression of video content at least at the same speed, for example expressed in frames per second, as it is generated by one or more video content sources. For instance, if content is generated at 50 frames per second (fps) it will be deemed encoded in real-time as long as it is also encoded at at least 50 fps.

In the present description, the term "live content" refers to content, for example multimedia content, that is distributed, for example using an OTT distribution mode, in dynamic mode (as opposed to the static distribution mode). Live content will typically be generated by a television station, or by any type of television medium, and may also be distributed on a multimedia content broadcast network, in addition to being made available on content servers in an OTT distribution system.

In the present description, the terms "terminal", "user equipment", "reader", "reading device", "reading terminal" and "video reader" are used interchangeably to denote any type of device, implemented by one or more items of software, one or more items of hardware, or a combination or one or more items of software and one or more items of hardware, configured so as to use multimedia content distributed in accordance with a distribution protocol, for example a multi-screen distribution protocol, in particular by loading and by reading the content. The terms "client" and "video-reading client" are also used interchangeably to denote any type of device, software and/or hardware, or any function or set of functions, implemented by software and/or hardware within a device and configured so as to use multimedia content distributed in accordance with a distribution protocol, for example a multi-screen distribution protocol, in particular by loading the content from a server and by reading the content.

The terms "network" and "communication network" as used in the present description refer to one or more data links that may couple or connect possibly virtualized equipment so as to allow electronic data to be transported between computer systems and/or modules and/or other devices or electronic equipment, such as between a server and a client device or other types of devices, including between wireless devices that are coupled or connected via a wireless network, for example. A network may also include a mass memory for storing data, such as a NAS (network attached storage), a SAN (storage area network) or any other form of computer-readable or machine-readable medium, for example. A network may comprise, in full or in part, the Internet, one or more local area networks (LAN), one or more wide area networks (WAN), wired connections, wireless connections, cellular connections or any combination of these various networks. Similarly, subnetworks may use various architectures or conform with or be compatible with various protocols, and interoperate with larger networks. Various types of equipment may be used to make various architectures or various protocols interoperable. For example, a router may be used to provide a communication link or a data link between two LANs that would otherwise be separate and independent.

The methods proposed in the present subject disclosure may be implemented by any video packager, video packaging unit configured for packaging multimedia content.

FIG. 1 shows an exemplary multimedia content distribution system according to one or more embodiments of the subject disclosure.

Shown on FIG. 1 is a system 100 comprising multimedia (e.g. video) content distribution subsystem 101 configured to deliver multimedia content to one or more terminals (shown as players 102) at the end of a distribution chain, for example upon request of such players. The subsystem 101 may typically comprise a Live Transcoder subsystem 103 configured for receiving Live Channels 103a as input data, and based on received Live Channels generate source media flows with different quality levels which are output as Live Channels 104a to an Origin/Packager subsystem 104. The Origin/Packager subsystem 104 may typically be configured to receive as input the source media flows and generate OTT content upon request received from a player 102 through a data communication network 105 to which it is connected. The CDN network 105 may be provided in the subsystem 101 as an intermediary between the terminals 102 and the Origin/Packager subsystem 104 configured for serving requests for content originated from the terminals 102. The Origin/Packager subsystem 104 may advantageously also be adapted for implementing one or more embodiments of the proposed methods.

Content received by the Live Transcoder subsystem 103 may be uncompressed or very lightly compressed. For example, the Live Transcoder subsystem 103 may be configured to receive uncompressed video content which may be transported using a data communication link suitable for carrying raw video content, such as an SDI (Serial Digital Interface) link, a TSoIP (Transport Stream over IP) link or a HDMI (High-Definition Multimedia Interface) link. As illustrated in FIG. 1, uncompressed content may be provided to the Live Transcoder subsystem 103 using a TSoIP link. A person of ordinary skill in the art would understand that any type of link suitable for transporting uncompressed or very lightly compressed video content may be used in place of the TSoIP links of FIG. 1, which are provided as an example only.

The Live Transcoder subsystem may be configured for encoding/compressing received channels in live mode, that is, as they are received, and to also output encoded channels in live mode, that is, as they are produced.

As illustrated on FIG. 1, in one or more embodiments the Live Transcoder subsystem 103 comprises one or more transcoding servers, which may comprise one or more encoding and/or transcoding engines, also referred to in the following as source encoders. These one or more servers are preferably configured for encoding content (such as video content and/or audio content) for each "Live Channels" received by the Live Transcoder subsystem 103. In some embodiments the servers may be configured for encoding in real-time different types of content (for example different types of video content) at corresponding transcoding points along the transcoding workflow.

Content output by the Live Transcoder subsystem 103 to the Origin/Packager subsystem 104 may be transported using a data communication link suitable for carrying compressed video content, such as for example a Multi Bitrate Transport Stream (MBTS) link as illustrated on FIG. 1. In one or more embodiments, the media stream output to the Origin/Packager subsystem 104 may be a media stream supporting low-latency, that is, a media stream which is configured for use in media distribution systems supporting low-latency. Such a media stream may carry information indicating a chunk structure, in addition to carrying information indicating a fragment structure, and/or a segment structure in addition to carrying media data.

In one or more embodiments, the data communication network 105 may be a Content Distribution Network or a Content Delivery Network (CDN).

A person of ordinary skill in the art would understand that any type of network suitable for providing fast delivery of Internet content, such as video content, may be used in place of the CDN 105 of FIG. 1, which is provided as an example only, and that any format suitable for transmission of multimedia content, such as video content, with very low latency, may be used, such as the CMAF (Control Media Application Format) format, which is provided as an example only. Using a CDN advantageously allows leveraging the existing CDN infrastructure, whether public or private, for data communication between the Origin/Packager 104 of the system and the terminal 102 (which may for example be a player embedded in a computer, a smartphone or a tablet at a users' site).

A "pull"-type data communication mechanism may typically be used for data communication between the Live Transcoder 103 and the Origin/Packager 104, and between the terminal 102 and the Origin/Packager 104 through the CDN 105, according to which the Origin/Packager 104 (respectively the terminal 102) may request data from the Live Transcoder 103 (respectively the Origin/Packager 104) as it is ready to receive such data (through the CDN for the terminal 102). In this case, data communication would be guided by the Origin/Packager 104 (respectively the terminal 102) instead of the Live Transcoder 103 (respectively the Origin/Packager 104).

The Origin/Packager 104 may typically be configured for generating files suitable for corresponding media transport protocols and readable by the terminal which requested the content. In an OTT distribution system, content generated by the packager may be referred to as OTT content, that is, content that may be distributed to terminals using data communication mechanisms used in OTT distribution, such as the HLS protocol, the MSS protocol, the HDS protocol and the MPEG DASH protocol.

Standard OTT packaging operates by generating and publishing as soon as possible, that is without waiting for a request for content, all contents for all OTT protocols.

In contrast, "just-in-time" OTT packaging (sometimes also referred to as "on-the-fly" packaging) operates asynchronously, by generating and publishing content only upon and subject to receiving a request for such content.

In one or more embodiments, the data communication between the Transcoder 103 and the Packager 104 may use a low latency data communication mechanism, such as for example provided by the CMAF data communication mechanism. The CMAF mechanism provides a container format and a specific means for formatting and packaging audio/video content which allows transmission of audio/video content with low latency (between the time content is received at the Transcoder 103 and the time such content is displayed at a terminal 102). Content formatted according to the CMAF may advantageously be transferred over IP-based communication network and IP-based communication links. Low latency is achieved because CMAF formatted content can be transferred in smaller data units, called chunks (atomic units) as compared to other, traditional formats. According to traditional formats, a segmentation structure in fragment units is typically used, whereas in formats supporting low latency, a segmentation structure in chunk units that are smaller in size than fragment units may be used, so that in systems supporting low latency a fragment may carry one or more chunks. As an example, the streaming latency for encoding, distributing, decoding and displaying video content is typically in the order of 30 seconds or more. When using the proposed low latency data communication mechanisms (such as CMAF), a reduced latency for encoding, distributing, decoding and displaying video content of approximately 3-5 seconds may be achieved. A person of ordinary skill in the art would understand that other suitable formats providing low-latency data communication of video content, such as Low Latency HTTP Live Streaming (LL HLS), in its current or future versions, may be used in place or as a complement of CMAF, in its current or future versions, which is given only as an example.

The Packager 104 may in one or more embodiments be configured for receiving data outputted by the Transcoder 103 and formatted using the CMAF low latency data communication mechanism.

In one or more embodiments, uncompressed and/or lightly compressed content may be encoded using advanced video compression standards (such as, but not limited to, HEVC, AV1 or VVC, or typically any video compression scheme which performs a bitrate compression by a factor of 100 or more as compared to a SDI bitrate) to minimize bandwidth requirements while maintaining a high quality for the video. Similarly, audio content, such as corresponding to audio accompanying the video content, may be compressed using advanced audio codecs such as, but not limited to, HE-AAC or AC-4.

Figure 2:
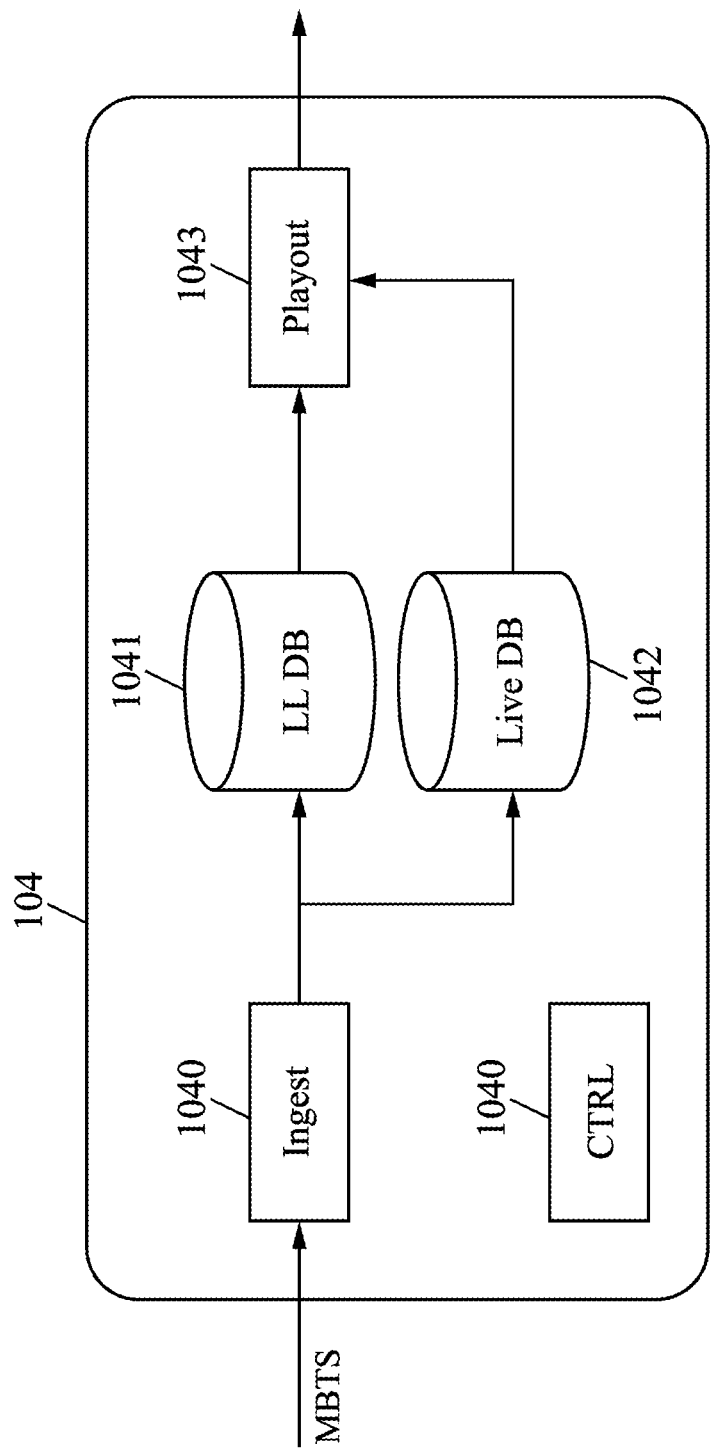
FIG. 2 is a block diagram illustrating an exemplary functional architecture of a media packager in accordance with one or more embodiments.

FIG. 2 illustrates an exemplary functional architecture of a packaging unit, such as the one illustrated on FIG. 1, according to one or more embodiments of the present subject disclosure.

The packaging unit 104 shown on FIG. 2 comprise an input interface unit (labeled "Ingest") 1040 configured to receive video stream data from a live source, such as the Transcoder subsystem 103 illustrated on FIG. 1, for example according to a Multi Bitrate Transport Stream (MBTS) data communication protocol. A person of ordinary skill in the art would understand that any media data transport format suitable for encapsulating media data (e.g. audio and/or video) for transport, such as transport or distribution of video streams (e.g. the MPEG-4 Part 14 or MP4 format) in place of or in combination with the MBTS format of FIGS. 1 and 2, which is provided as an example only.

In one or more embodiments, a received media stream (e.g. video stream) supporting low latency may be segmented in media segments, each media segment comprising one or more media data fragments, each media data fragment comprising one or more media data chunks. For example, in one or more embodiments, the packaging unit 104, in particular the Ingest unit 1040, may be configured to receive media data chunks and metadata related thereto.

Depending on the embodiments, the media stream received by the Ingest unit 1040 may be segmented into units of increasing granularities, such as media segments and/or media data fragments and media data chunks.

The proposed exemplary Ingest unit 1040 may therefore advantageously be configured for receiving media data according to a predefined media format with low latency support, such as, for example, CMAF. The Ingest unit 1040 may additionally be configured to be capable of distinguishing in the received data media data chunks, in particular media data of each received media data chunk and metadata related thereto.

For example, in some embodiments, the Ingest unit 1040 may be configured for receiving one or more media streams, each media stream being segmented into media data fragments, and each media data fragment comprising one or more media data chunks.

In particular, the Ingest unit 1040 may in some embodiments be configured for receiving CMAF chunks, for example through receiving CMAF fragments, and metadata related thereto such as, for example, information indicating the media stream to which each received CMAF chunk corresponds, and information indicating the CMAF fragment and/or corresponding CMAF segment to which the CMAF chunk corresponds.

In one or more embodiments in which one or more of the received media stream(s) are not segmented according to a format supporting low latency, the Ingest unit 1040 may be configured for dividing a received media (e.g. video) stream into media data packets or units of a predefined granularity, for example according to a specified media format, such as CMAF, and for generating metadata describing the data packets or units.

For example, in some embodiments, the Ingest unit 1040 may be configured for dividing a received media stream into media data chunks, through segmenting the received video stream into media segments, each media segment being segmented into one or more media data fragments, each media data fragment being segmented into one or more media data chunks, and for generating metadata describing the segments, fragments, and chunks.

For example, in some embodiments, the Ingest unit 1040 may be configured for dividing a received media stream into segments, fragments, and chunks according to the CMAF format, thereby generating CMAF segments, fragments, and chunks and corresponding metadata based on received media stream data.

Therefore, the Ingest unit 1040 may be advantageously configured to organize received video stream data into a format compatible with low latency protocols and schemes, so that the proposed packaging unit 104 may advantageously be capable of handling media (e.g. video and/or audio) data received from a live source while leveraging the benefits of schemes specifically designed for low latency.

In one or more embodiments, the Ingest unit 1040 may be operatively coupled to a first memory (labeled "LL DB", for "Low Latency Database" on FIG. 2) 1041 and may be configured to write data into the LL DB 1041, for example under the control of a control unit 1040 of the packaging unit 104 comprising a processor.

In one or more embodiments, the Ingest unit 1040 may further be operatively coupled to a second memory (labeled "Live DB", for "Live Database" on FIG. 2) 1042 and may be configured to write data into the Live DB 1042, for example under the control of the control unit 1040 of the packaging unit 104.

According to exemplary embodiments of the present subject disclosure, the first memory (LL DB memory 1041) may advantageously be configured to store one or more media data chunks of the media stream, so that the chunks stored in the first memory may be separately addressable data units for memory read in the first memory 1041. The second memory (Live DB memory 1042) may be configured to store one or more media data fragments of the media stream, so that the fragments stored in the second memory may be separately addressable data units for memory read in the second memory 1042, that is, to store media data at a coarser granularity level than the first memory 1041. Media data of the processed media stream may therefore be stored, depending on the time lapse after reception of such media data, only in the first memory 1041, only in the second memory 1042, or in both the first memory 1041 and the second memory 1042. The first memory (LL DB memory 1041) may therefore be configured in one or more embodiments to store chunks of a received media stream that supports low latency (that is, that is segmented in chunks on top of being also segmented in fragments) and be considered a memory the use of which is dedicated to the processing of received media streams supporting low latency. In contrast, the second memory (Live DB memory 1042) may be configured in one or more embodiments to store fragments of received media streams that may or may not support low latency (that is, segmented in fragments however not necessarily segmented in chunks) and be considered a memory used for the processing of received media streams, whether or not supporting low latency.

The use of two memories to store received media data, one configured for handling received media streams that support low latency (e.g. segmented in chunks that are data units smaller than fragments), and one configured for handling received media streams that do not support low latency (e.g. not segmented in data units of a finer granularity than fragments) advantageously provides versatility to the proposed packaging unit. For example, if the first memory (LL DB memory) is well suited for supporting live services with low latency, the second memory (Live DB memory) can be used for support of live and timeshift services, so that the proposed packager unit that integrates both memories may advantageously provide support for a priori incompatible services, that is, live and timeshift support on the one hand, and live with low latency on the other hand.

As their respective use is different, the first and second memories may advantageously be of different types, and be implemented as separate memory media.

For example, in one or more embodiments, the first memory (LL DB memory) 1041 may be implemented as a memory local to a processor running the packaging unit 104 or local to a processor or control unit of the media distribution unit, so as to reduce memory access latency, for example as one or more of a Random Access Memory, RAM, memory and/or a flash-based memory. In order to save implementation costs, the storage capacity of the LL DB memory 1041 may in some embodiments be chosen limited so as to support storage of a predetermined cumulative time duration of stored video stream(s), for example limited to a few minutes.

As the second memory (Live DB memory) 1042 may be configured to store media data corresponding to a cumulative time duration which may be significantly higher than the cumulative time duration storage capacity for which the first memory is dimensioned, the second memory 1042 may in some embodiments be implemented as a memory which is not local to a processor or control unit of the media distribution unit, for example as one or more persistent storage media (sometimes referred to as non-volatile memory), such as one or more mass storage devices and/or systems (e.g. hard disk drives (HDD), Solid-State Drives (SSD), Redundant Array of Independent Disks (RAID), etc. or a combination thereof). The second memory 1042 may be used as an archive in which media data fragments, including "old" media data fragments which, depending on the embodiment, may correspond to hours, days, months or even years after a current time of processing the media stream, are stored.

The packaging unit 104 shown on FIG. 2 may further comprise an output interface unit (labelled "playout" unit) 1043 configured for generating data outputted from the packaging unit 104.

In one or more embodiments, the playout unit 1043 may be configured for receiving requests related to media data, for example from media players, and serving such received requests. The requests related to media data may, depending on the embodiments, be of various types, such as a request for media data (e.g. a request for one or more specific chunks (e.g. CMAF chunk) of the media stream, a request for one or more specific segments (e.g. CMAF segment) of the media stream, or a combination of the above), a request for media data metadata (e.g. a request for a manifest).

Depending on the embodiment, the playout unit 1043 may be configured for receiving requests according to one or more formats, such as, for example, HTTP requests comprising requests related to media data, and for producing responses according to such formats, such as, for example, HTTP responses in response to received HTTP requests.

In one or more embodiments, the playout unit 1043 may be configured for generating data further to reception of a request for multimedia data in order to serve the request by sending the data to the requestor. Depending on the embodiment, the playout unit 1043 may be configured for generating one or more data files, data packets, data units, media objects, or protocol data units according to the data communication protocol used for the request (e.g. an OTT protocol), to be sent to the requestor in connection with a response to the request.

In one or more embodiments, the playout unit 1043 may further be configured to implement a so-called "block/partial" function, according to which the playout unit 1043 may further be configured to hold on a request for media data until the playout unit 1043 is made aware that the requested media data has been received and is stored in memory of the packaging unit 104. For example, the playout unit may be configured to hold on a request for a chunk until the requested chunk is listed in an updated chunk list for which an event has been received. Upon receipt of the event, the playout may serve the request by retrieving the chunk in the first memory (LL DB memory 1041) based on the chunk list file, and by sending the chunk to the entity from which the request was received.

Exemplary operations of the ingest unit 1040, the LL DB memory 1041, and playout unit 1043 are described below in connection with FIG. 4*a*.

In media (e.g. video) encoding, for example for video streaming usage, a media (e.g. video) stream (e.g. a video sequence) to be transmitted may be encoded at an encoding side by dividing the media stream into media units, prior to encoding. The decoding will then address encoded media units, each of which will be decoded at the decoding side. For example, in embodiments using the CMAF format, an input media stream to be encoded may first be divided into media data fragments, and each media data fragment may be encoded.

A media stream, such as for example a video sequence comprising a set of images, may thus be divided into consecutive segments, each segment being a media object that is separately addressable, for example by a media player, in a request for media data. For example, a segment may in some embodiments represent a data unit that is separately downloadable by a media player. A segment may be defined by the protocol used for distribution of the media stream. In one or more embodiments, a segment may contain one or more fragments, a fragment representing a data unit that separately encodable by a media encoder. The media stream may then be divided into segments, each segments comprising one or more fragments, with the fragments of the stream being encoded sequentially, for example as they are distributed. Referring to FIG. 2, data comprised in encoded fragments that may be received by the Ingest 1040 are processed according to the proposed method, and formatted according to a relevant format before being output for distribution by the Playout 1043. Depending on the embodiment, the Playout 1043 may be configured to output media data of the media stream in data units according to one or more granularities, such as media segments and/or media data chunks. For example, in embodiments in which CMAF is used, the packager (104) of FIG. 2 may be configured for receiving and processing media data in the form of encoded CMAF fragments, and outputting media data in the form of encoded CMAF chunks and/or CMAF segments. Each media data unit that is transmitted, for example during video streaming, thus represents an encoded part of the video sequence or of the initial video stream for a given quality, and can be decoded independently of other units of the video sequence. The phase of encoding the media data prior to transmission aims to compress the data of the media stream in order to limit the resources required to transmit it and/or to store it.

In the field of media streaming, segments may be further divided into a sequence of subsets, usually called chunks, for example according to a low latency transport format such as CMAF. Various media stream transport protocols, such as HLS (HTTP Live Streaming) or DASH (Dynamic Adaptive Streaming over HTTP), use stream segmentation. The use of segments divided into low latency chunks has been introduced more recently for these video stream transport protocols, for example through the introduction of CMAF for DASH, and the specification of Low Latency HLS (LL-HLS). The finer granularity provided by the chunks which are nevertheless data units that can be separately addressable by a request for media data, for example for downloading and playing such media data by a media player, provides low latency as the waiting time between the starting time of a media object (e.g. chunk) and its time of availability at a media player is reduced thanks to the smaller size of the chunks. Indeed, chunks, that are designed to be smaller in size than fragments, can be processed more often, and the processing of a chunk can be completed faster than the processing of a larger media object. As a consequence, the time delay between the time corresponding to the start of the chunk and the time at which the chunk can be displayed is reduced.

Each segment may therefore include one or more chunks, where each chunk can be transmitted separately. In contrast to the segments, however with the exception of the first chunk in each segment which is independently decodable, chunks belonging to the same segment are dependent on each other for decoding. For example, 2-second long CMAF segments may each be divided into four 500-ms long chunks. The first chunk of each segment may be independently decodable, while the remaining chunks within the same segment may not. Because the chunks are much smaller than the segments, the chunks may be transmitted much faster than the segments.

FIG. 3 illustrates an exemplary CMAF segment that may be used in one or more embodiments.

As shown on FIG. 3, a CMAF segment may comprise one or more CMAF fragments, and each CMAF fragment may itself comprise one or more CMAF chunk, the chunk being the smallest data unit that may be generated for a CMAF container.

A media stream which is not intended for use in media distribution systems supporting low-latency may carry information indicating a fragment structure, and/or a segment structure in addition to carrying media data, and may not carry information indicating a chunk structure. Information regarding a segmentation structure of the flow, such as information regarding the fragments and, as the case may be, the segments of the media flow, may be represented by metadata carried by the media flow.

In contrast, a media flow supporting low latency, such as for example a CMAF media flow, may carry information indicating a chunk structure, a fragment structure, and/or a segment structure, typically through metadata describing the chunk structure, fragment structure, and/or segment structure of media data carried by the flow. Information regarding a segmentation structure of the flow, including segmentation at the chunk level, such as information regarding the chunks and fragments and, as the case may be, the segments of the media flow, may also be represented by metadata carried by the media flow.

A media flow may be configured according to various formats, such as, for example, the Multi-Bitrate Transport Stream (MBTS) or MP4 format, and may comprise data units configured according to the format of the media flow.

For example, a MP4 media flow may be structured as a sequence of data units of different types, usually called "boxes", each box carrying media data of the flow and/or metadata related to the media data of the media flow.

A media flow which does not support low latency will typically carry information indicating a fragment structure, in the form of metadata parts associated with respective fragments of the media flow. For example, a fragment of a media flow with no low latency support may include a "moof" part which contain information related to media samples of the fragment, such as, for example, size information for the fragment, and duration information for the fragment, and a "mdat" part which contains the media data of the fragment.

For example, a MP4 media flow which does not support low latency may comprise a sequence of boxes, and for each fragment of the MP4 media flow, a Movie Fragment Box ("moof") box which contains information related to media samples of the fragment, such as, for example, size information for the fragment, and duration information for the fragment, and a Media Data Box ("mdat") box carrying media data of the fragment.

In contrast, a media flow which supports low latency (and therefore will be segmented into chunks, that is, data units smaller than a fragment) will typically carry information indicating a chunk structure, in the form of metadata parts associated with respective chunks of the media flow, in addition to information indicating a fragment structure, for example as described above with respect to media stream not supporting low latency. For example, a chunk of a media flow with latency support may include a "moof" part which contain information related to media samples of the chunk (such as, for example, size information for the chunk, and duration information for the chunk), a "mdat" part which contains the media data of the chunk, and a "styp" part which contains information related to the fragment to which it belongs (for example information indicating that the chunk starts a new fragment).

For example, a MP4 media flow which support lows latency may comprise a sequence of boxes corresponding to a sequence of chunks comprised in successive fragments. Each chunk of the MP4 media flow may comprise a Movie Fragment Box ("moof") box which contains information related to media samples of the box, a Media Data Box ("mdat") box carrying media data of the chunk, and a "styp" box which contains information related to the fragment to which the chunk belongs (for example information indicating that the chunk starts a new fragment).

In the example of a CMAF chunk of a MP4 media flow supporting low latency, as illustrated on FIG. 3, a CMAF chunk may contain a "styp" box, a "prft" box, an "emsg" box, and at least a "moot" box and a "mdat" box. In each CMAF chunk, the mdat box is a section holding the media data (audio, video, or text) of the chunk, while the moof box is a descriptor of the content of the chunk. The "styp" box may comprise a "cmfl" brand. If it also includes a "cmff" brand, such "cmff" brand indicates that the chunk carrying it starts a new CMAF fragment.

In some embodiments, for example in which the media stream is in the form of a MP4 stream, or a MP4 stream is obtained based on a received media stream, a MP4 media stream supporting low latency may be obtained and processed by the media distribution unit. The processed media stream supporting low latency may carry metadata related to media data chunks comprised in the media stream, and such metadata may advantageously be used to store the chunks in a dedicated memory, that is, a memory configured for storing chunks in contrast to a conventional memory that would be configured for storing fragments comprised in a media stream which does not support low latency.

For example, a sequence of CMAF chunks comprised in a MP4 media stream and belonging to a CMAF fragment may be signaled through the position of a first CMAF chunk of the sequence (that is, the CMAF chunk comprising metadata indicating that it starts a new fragment) and the subsequent CMAF chunks of the sequence in the fragment (that is, one or more CMAF chunks subsequent to the first chunk of the sequence and not comprising metadata indicating that they start a new fragment). As indicated above, the first CMAF chunk in the fragment may comprise a "styp" box comprising a "cmff" brand as well as a "cmff" brand indicating that the CMAF chunk is the first chunk of the fragment, and one or more "moof" and "mdat" boxes As applicable to segment, fragment or chunk data units, the styp box comprised in a data unit carrying media data may in general serve as a header of the data unit (the media data being carried in a payload part of the data unit), and may be used to carry information related to the data unit (e.g. function, type, etc.).

As illustrated on FIG. 3, a CMAF fragment may comprise one or more CMAF chunks, each having the structure described above, and further comprises a styp box. The styp box of a fragment may be used to identify the corresponding data unit as a CMAF fragment (through use of the "cmff" brand) or simply as a fragment (through use of the "cmfl" brand).

Likewise, a CMAF segment may comprise one or more fragments, and further comprises a styp box The styp box of a segment may be used to identify the corresponding data unit as a CMAF segment (through use of the "cmfs" brand).

Figure 4A:
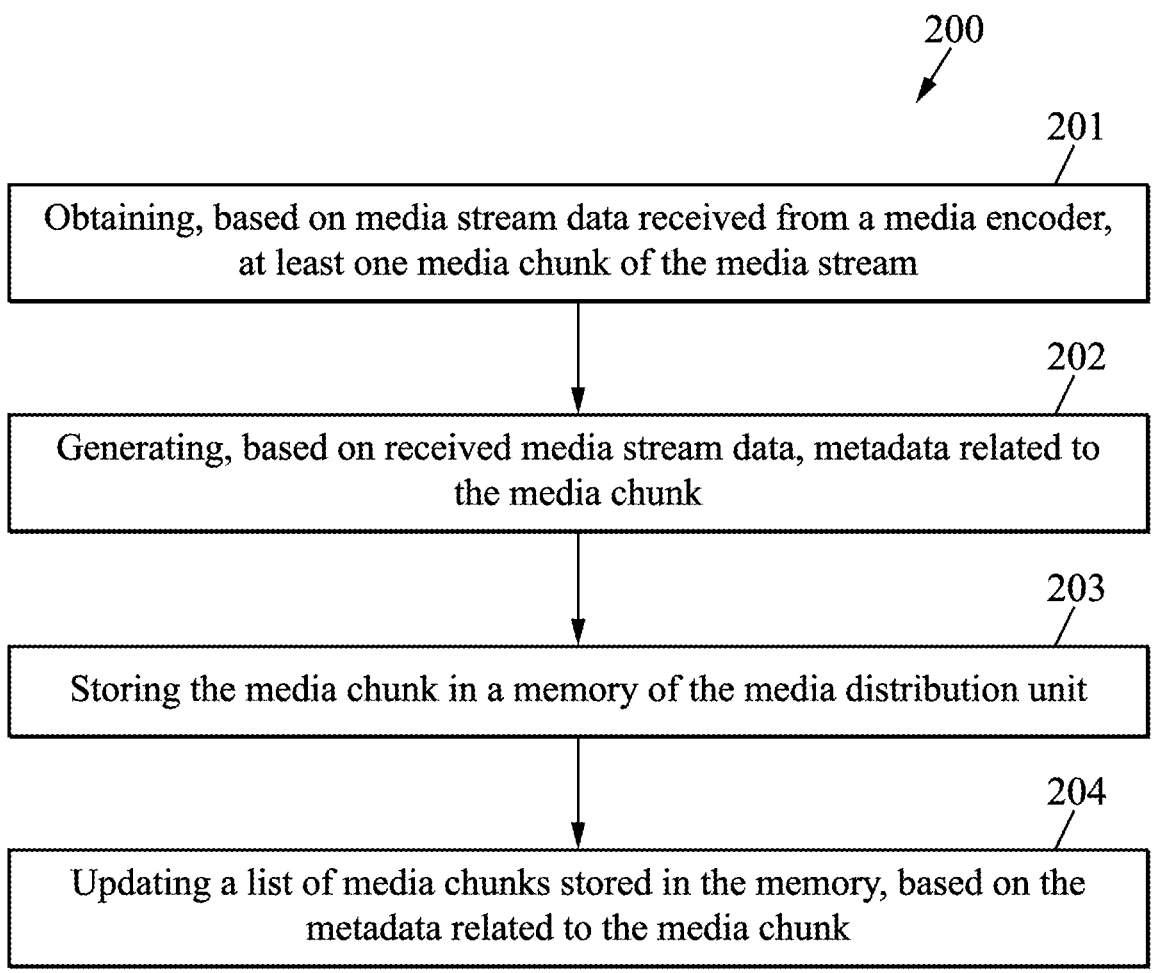
FIG. 4*a* illustrates an exemplary method of processing media streams for storing media data in accordance with one or more embodiments.

FIG. 4a illustrates an exemplary method for processing a media (e.g. video) stream for storing media data according to one or more embodiments of the present subject disclosure. FIG. 4a illustrates operations that may preferably be carried out at a media distribution unit, such as a packager unit as illustrated on FIG. 2, configured for implementing one or more embodiments of the proposed methods.

In one or more embodiments, such media distribution unit may comprise an input interface (e.g. an ingest function as described above) configured for receiving one or more video streams segmented into encoded media data chunks. The received media data chunks may in some embodiments be comprised in encoded media data fragments, a media data fragment being a media data unit that is separately encodable/decodable. encoded media data fragments, each comprising one or more chunks, or into encoded media data chunks.

As shown on FIG. 4a, the media distribution unit may obtain (201) at least one media data chunk of the media stream, based on media stream data received from a media encoder. The at least one media data chunk may be a data unit that is separately addressable by a request for media data received by the media distribution unit. That is, the media distribution unit may be configured to receive requests for media data that are formulated as requests for one or more media data chunks.

In one or more embodiments, the media distribution unit may be configured for receiving a media stream that is segmented into media data chunks. In these embodiments, media stream data received from the media encoder may already include media data chunks and metadata related thereto, and the media distribution unit may obtain the chunks by receiving them.

In one or more embodiments, the media distribution unit may be configured for receiving a media stream that is segmented into media data fragments, each fragment containing one or more media data chunks. In these embodiments, media stream data received from the media encoder may already include media data fragments and metadata related thereto, and the media distribution unit may obtain the chunks by receiving the fragments and related metadata, and based on such metadata by extracting the chunks contained in the fragments.

In one or more embodiments, the media data chunks (respectively media data fragments) received by the media distribution unit may be CMAF chunks (respectively CMAF fragments) carrying media data of the received media stream.

In one or more embodiments, the media distribution unit may be configured for receiving a media stream that is not segmented into media data chunks, in which cases the media distribution unit may be further configured to segment the received media stream data into media data chunks, possibly through a first segmentation into media data fragments, and for generating corresponding metadata, including metadata describing the chunk segmentation. In these embodiments, media stream data received from the media encoder may not already include identifiable media data chunks and metadata related thereto or coarser granularity units such as identifiable media data fragments containing chunks and metadata related thereto, and the media distribution unit may obtain the chunks by generating them based on the received media stream data.

Once the media data chunk has been obtained, metadata related to the media data chunk may be generated (202), based on the received media stream data. In some embodiments, such metadata may be generated based on metadata comprised in the received media stream data. Depending on the embodiment, metadata generated for a chunk may include one or more of the following: a track identifier corresponding to the chunk, a timestamp of the chunk, a time duration of the chunk, a size (e.g. in bytes) of the chunk, and an offset of the chunk as stored in a file corresponding to a fragment containing the chunk.

In one or more embodiments using chunk and fragment media objects, wherein a fragment may comprise one or more chunk, the metadata related to the media data chunk may comprise information on a media data fragment to which the media data chunk belongs. Therefore in such embodiments the generated metadata may provide chunk-level information as well as fragment-level information. In some embodiments such information may advantageously be leveraged by storing the media data chunk in the memory in the form of a fragment file containing the media data chunk, in particular in the case where the information on the media data fragment to which the media data chunk belongs indicates that the media data chunk is a first chunk of the media data fragment.

In some embodiments using chunk, fragment, and segment media objects, wherein a segment may contain one or more fragments, each fragment itself containing one or more chunks, the generated metadata may indicate, for each chunk, the fragment and/or segment to which the chunk belongs, and as the case may be indicate for each fragment the segment to which the fragment belongs. In some embodiments the generated metadata related to a chunk may indicate whether or not the chunk is a first chunk of the fragment.

The media data chunk may further be stored (203) in a memory of the media distribution unit, which may be configured to store media data chunks as separately addressable data units for a memory read from the memory. Referring back to FIG. 2, the memory used to store the received chunks may be the first memory (LL DB memory) 1041 of the packaging unit 104, so that chunks that are stored in the LL DB memory 1041 may be obtained by the ingest unit 1040 based on media stream data received by the ingest unit 1040.

In the following, for the sake of clarity, and without any limitation, the memory of the media distribution unit in which obtained media data chunks are stored will be indifferently referred to as the "first memory" or as the "low-latency memory" or "LL memory".

The proposed method therefore advantageously allows handling media stream data received from a live source with low latency capabilities, by storing into memory such received video stream data in a chunk format suitable for low latency processing.

In one or more embodiments, a list of media data chunks stored in the LL memory may be updated (204) based on the metadata related to the stored media data chunk.

In some embodiments, the list of media data chunks stored in the LL memory may comprise an identifier of each media data chunk stored in the LL memory with its corresponding metadata.

The list of media data chunks stored in the LL memory may advantageously be used by other functions of the media distribution unit for using the media data chunks stored in the LL memory. The list of media data chunks may therefore provide a convenient mean of managing the LL memory as a storage area configured for storing low latency format media data chunks and metadata related thereto.

In one or more embodiments, for each newly obtained chunk, a new fragment file may be created to be stored in the LL memory as a container of the chunk in the case where metadata related to the chunk indicates that the chunk is the first chunk of the fragment.

Otherwise, that is in the case where metadata related to the chunk indicates that the chunk is not the first chunk of the fragment, the fragment file will have already been created for its first chunk, and the chunk may be stored in this fragment file.

In one or more embodiments, the metadata may comprise information based on which retention in the LL memory of the corresponding chunk may be managed.

For example, in one or more embodiments, the metadata corresponding to a stored chunk may comprise a timestamp for the media data chunk. In these embodiments, the method may further comprise the determining, based on the timestamp, whether the media data chunk was stored in the LL memory for a time period exceeding a predetermined duration.

In some embodiments, the timestamp may be determined according to a first time source, and as such may correspond to a time at which the chunk was stored in the memory, so that a comparison of the timestamp with a current time may allow determining a first duration during which the chunk was stored in the memory that may be compared to a predetermined duration, for example for determining whether or not the chunk is considered too "old" and should be deleted from the LL memory.

In other embodiments, the timestamp may be determined according to another time source, and as such may correspond to a time associated to the chunk in the media stream, so that a comparison of the timestamp with a time associated with a currently processed or last received chunk of the media stream may allow determining another duration during which the chunk was stored in the memory that may also be compared to a predetermined duration, for example for determining whether or not the chunk is considered too "old" and should be deleted from the LL memory.

Therefore, depending on the embodiment, the management of chunks stored in the LL memory, and in particular the decision to delete a chunk from the LL memory, may be made in consideration with various time sources. For example, a first time source may correspond to time measured by a clock unit of the media distribution unit, and another time source may correspond to time used for timing of the media stream.

In one or more embodiments, the chunk may be deleted from the LL memory based on the determination that the media data chunk was stored in the LL memory for a time period exceeding the predetermined duration.

Depending on the embodiment, the predetermined duration may be chosen based on the capacity of the LL memory used. For example, the predetermined duration may be chosen to be a few minutes, e.g. a number of minutes in the 1 minute to 10 minutes range.

Such a retention duration mechanism advantageously allows managing the LL memory to be used for a limited period of time for each chunk stored therein, which in turns allows selecting a short-term memory with limited storage capacity in order to control costs, and/or allows operating the LL memory in line with the computing power of the processor used for managing the LL memory. The proposed use of a LL memory with limited storage capacity also advantageously avoids unnecessarily increasing the processing time associated with distribution of the media stream, and well as the time devoted to management of the LL memory. Indeed, the larger the LL memory storage capacity, the higher the processing cost of management of the LL memory (data memory read latency, chunk search in the LL memory latency, etc.).

In one or more embodiments, the media data chunk that is managed through the proposed methods may comprise chunks corresponding to tracks respectively corresponding to different types of media, such as, for example, an audio chunk, a video chunk, and/or a text chunk. The embodiments of the methods of the present subject disclosure may then be adapted according to the segmentation structure used in such embodiments. For example, received video stream data may be divided according to different tracks, such as audio, video, and/or text tracks, and depending on the embodiment, video segments, video fragments, and video chunks, audio segments, audio fragments, and audio chunks, and text segments, text fragments, and text chunks, wherein audio chunk belong to audio fragments, video chunks belong to video fragments, and/or text chunks belong to text fragments, may be generated and processed according to embodiments of the present subject disclosure.

In one or more embodiments, media data chunks stored in the LL memory may be provided by the media distribution unit upon request, for example from media players such as the player 102 illustrated on FIG. 1. In some embodiments, the proposed method may further comprise the receiving a request for transmission of the media data chunk from an output unit configured for outputting media data playable by a media terminal.

Referring back to FIG. 2, such requests may be received and processed by the playout unit 1043. In some embodiments, requests for media data received by the playout unit 1043 may take the form of an HyperText Transfer Protocol (HTTP) request. In such embodiments, the playout unit 1043 may implement a HTTP server to serve HTTP requests received from clients, such as players.

Depending on the embodiment, the consumption of the media data stored in the LL memory may be performed using a polling mechanism or using an update mechanism.

In embodiments where a polling mechanism is used, the playout unit 1043 may be configured for periodically reading the list of chunks stored in the LL DB memory 1041 and update its own list of available chunks in order to serve incoming requests for media data.

In embodiments where an update mechanism is used, the control unit 1044 of the packager 104 may be configured to send a message informing the playout unit 1043 that a media data chunk is stored in the LL DB memory 1041 for each media data chunk newly stored in the LL DB 1041 memory. In some embodiments, the message may be sent to the playout unit 1043 upon updating the list of media data chunks stored in the LL DB memory 1041. This mechanism may advantageously allow the playout unit 1043 to read the metadata stored in the list of media data chunks stored in the LL DB memory 1041 for media data chunks once the playout unit 1043 knows that such metadata is available in the list. Low latency may therefore be preserved through a mechanism in which the playout unit 1043 may read metadata regarding a chunk stored in a list upon reception of a request for the chunk in order to fetch the chunk in the LL DB memory 1041, without any need to repeatedly (e.g. periodically) query the list in order to know whether or not the requested chunk is available in the LL DB memory 1041 as the playout unit 1043 will have already made aware that the chunk is available in the LL DB memory 1041.

In embodiments where the update mechanism is used, the control unit 1044 of the packager 104 may further be configured to a message informing the playout unit 1043 that a media data chunk is no longer stored in the LL DB memory 1041 for each media data chunk deleted from the LL DB memory 1041.

This may advantageously avoid that the playout unit operates on information regarding chunks stored in the LL DB memory 1041 which is no longer current.

Figure 4B:
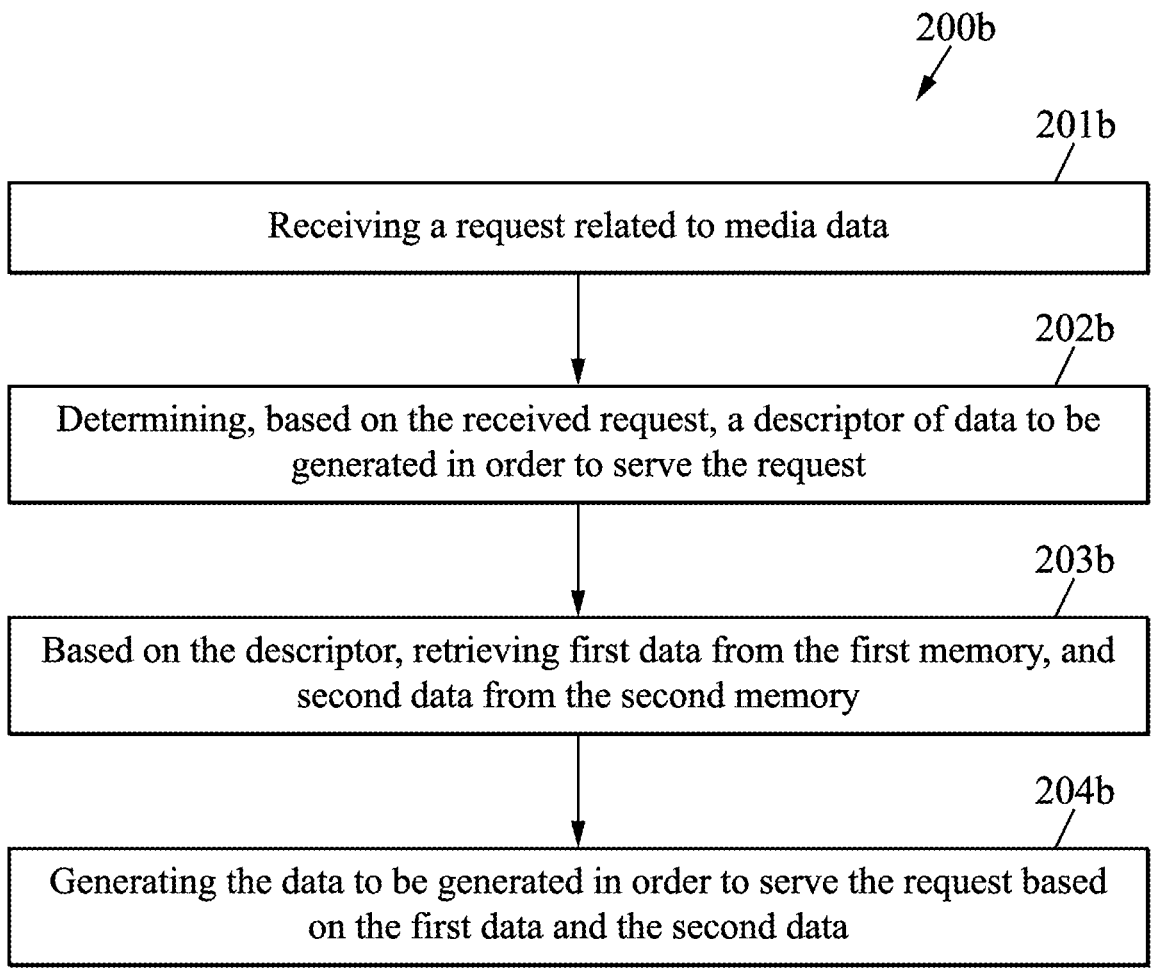
FIG. 4*b* illustrates an exemplary method of processing media streams for generating data in accordance with one or more embodiments.

FIG. 4b illustrate an exemplary method for processing a media (e.g. video) stream for generating media data according to one or more embodiments of the present subject disclosure. FIG. 4b illustrates operations that may preferably be carried out at a media distribution unit, such as a packager unit as illustrated on FIG. 2, configured for implementing one or more embodiments of the proposed methods. More specifically, embodiments of the proposed method for processing a media (e.g. video) stream for generating media data may be implemented in an output interface unit of a media distribution unit, such as the playout unit of the packager illustrated on FIG. 2.

In one or more embodiments, such media distribution unit may comprise an output interface (e.g. a playout unit (1043) as described above) configured for generating media data, in the form of addressable media objects that can be separately transmitted (e.g. CMAF media segments or CMAF media data chunks), and transmitting generated media data as a response to a request related to media data (e.g. a request for media data). The output interface may further be configured to generate media data metadata, and transmit such generated media data metadata as a response to a request related to media data (e.g. a request for media data metadata).

A media distribution unit configured for implementing embodiments of the proposed method for processing a media (e.g. video) stream for generating media data may further comprise a processor and first and second memories for storing media data, the first and second memories being operatively coupled to the processor, such as the control unit (1044), the LL DB memory (1041) and the Live DB memory (1042) of the packager (104) illustrated on FIG. 2. In one or more embodiments, the first memory (e.g. the LL DB memory (1041)) may be configured to store one or more media data chunks of the media stream which are separately addressable data units for memory read in the first memory (1041). The second memory (e.g. the Live DB memory (1042)) may be configured to store one or more media data fragments of the media stream which are separately addressable data units for memory read in the second memory (1041), the one or more fragments respectively comprising one or mode media data chunks. The second memory may therefore be configured to store media data with a coarser granularity format (fragment) than the format used for storing media data in the first memory (chunk).

As shown on FIG. 4b, the media distribution unit may receive (201b) a request related to media data.

In some embodiments, the request related for media data may for example comprise a request for media data, a request for media data metadata, or a combination thereof.

The received request related to media data may be processed in order to determine (202b), based on the received request, a descriptor of data to be generated in order to serve the request.

In one or more embodiments, the descriptor may indicate whether the request related to media data comprises a request for media data, in which case the output unit (e.g. the Playout unit (1043) of FIG. 2) will be need to generate media data in order to serve the request, or if the request related to media data comprises a request for media data metadata, in which case the output unit will need to generate media data metadata in order to serve the request. In such embodiments the descriptor may advantageously be used by the media distribution unit (e.g. the output unit thereof) to determine what type of data (e.g. data or metadata) it needs to generate in order to serve the request. The media distribution unit may therefore in some embodiments advantageously be configured to process the received request related to media data in order to determine the type of data it needs to generate to serve the received request, and act accordingly.

In one or more embodiments, the media distribution unit may be configured to retrieve (203b) first data from the first memory, and second data from the second memory, based on the descriptor. The media distribution unit may then generate (204b), based on the first data (which will have been retrieved from the first memory) and the second data (which will have been retrieved from the second memory), the data to be generated in order to serve the received request. In some embodiments, generating the data to be generated based on the first data and the second data may comprise combining the first data and the second data.

The proposed method advantageously provides a scheme that takes advantage of the first and second memories used for storing media data, wherein the first memory is configured for storing chunks, and therefore for operating with media objects designed for low latency transmission of media data, and the second memory is configured for storing fragments, that is, media objects of a coarser granularity than chunks, and therefore for operating with more conventional media objects that are not specifically designed for low latency transmission of media data. In order to serve a request related to media data, for example a request for media data (e.g. a request for CMAF chunks and/or CMAF segments) or a request for metadata, media data and/or metadata may be retrieved from both memories, and combined in order to address the different formats in which media data is stored in the respective memories. The data format in which the media data or metadata is generated may be dictated by the type of requested metadata or by the media data transmission protocol (e.g. the OTT protocol) used for responding to the request.

In some embodiments, the descriptor may correspond to media data metadata to be generated in order to serve the request. Such may typically be the case when the request related to media data is a request for metadata, such as, for example, a request for a manifest.

In such embodiments, the media distribution unit may be configured for performing a first determination, based on data stored in a first search memory, whether the metadata to be generated is related to media data stored in the first search memory. The first determination may advantageously be used to identify, in a first search memory which may be the first memory or the second memory, media data that is related to the metadata to be generated and is stored in the first search memory. Based on the first determination, first search data comprising metadata related to the identified media data stored in the first search memory may be retrieved from the first search memory.

Further to retrieving relevant metadata in the first search memory, the media distribution unit may retrieve relevant metadata from a second search memory, which will be the second memory in the case where the first search memory is the first memory, or else the first memory in the case where the first search memory is the second memory. That is, in some embodiments, first search data comprising metadata relevant for serving the request may be retrieved from a first search memory, which may be the first (respectively second) memory, and second search data comprising metadata relevant for serving the request may be retrieved from a second search memory, which may be the second (respectively first) memory.

In order to do so, the media distribution unit may in some embodiments be configured for performing a second determination, based on a second search memory, of second search data stored in the second search memory which is comprised in the metadata to be generated. The second determination may advantageously be used to identify, in the second search memory which may be, depending on whether the first search memory is the first memory or the second memory, respectively the second memory or the first memory, media data that is related to the metadata to be generated and is stored in the second search memory. Based on the second determination, second search data comprising metadata related to the identified media data stored in the second search memory may be retrieved from the second search memory.

Depending on the embodiment, the first memory may be searched subsequently to searching the second memory, or vice-versa, or first and second memories may be searched in parallel.

That is, in some embodiments, the first search memory may be the first memory, in which case the second search memory may be the second memory, the data stored in the first search memory may comprise a list of media data chunks stored in the first memory, the first search data may comprise metadata related to one or more chunks stored in the first memory, the first data may comprise the first search data, the data stored in the second search memory may comprise a list of media data fragments stored in the second memory, the second search data may comprise metadata related to one or more fragments stored in the second memory, and the second data may comprise the second search data.

In other embodiments, the first search memory may be the second memory, in which case the second search memory may be the first memory, the data stored in the second search memory may comprise a list of media data chunks stored in the first memory, the second search data may comprise metadata related to one or more chunks stored in the first memory, the first data may comprise the second search data, the data stored in the first search memory may comprise a list of media data fragments stored in the second memory, the first search data may comprise metadata related to one or more fragments stored in the second memory, and the second data may comprise the first search data.

In such embodiments, metadata may be retrieved from both the first and second memories of the media distribution unit in order to serve a received request related to media data, for example a request for metadata (e.g. a request for a manifest). The metadata retrieved from the first (respectively second) memory may be related to media data stored in the first (respectively second) memory.

In one or more embodiments, metadata related to media data stored in the first memory may be stored in the first (or second) memory. As media data stored in the first memory are media data chunk(s) that can be separately retrieved from the first memory, the metadata stored in memory may comprise a list of chunks that are stored in the first memory. Such list of chunks may be updated as one or more chunks are newly stored in the first memory and as one or more chunks are removed from the first memory. The list of chunks stored in the first memory may advantageously be used to determine whether metadata needed for serving the received request are related to chunks stored in the first memory, and to identify, as the case may be, one or more chunks stored in the first memory which are related to metadata needed to serve the received request. Metadata related to such chunks may then be retrieved from a memory (e.g. from the first memory) in which they are stored, and processed in order to generate the requested metadata.

Likewise, in one or more embodiments, metadata related to media data stored in the second memory may be stored in the second (or first) memory. As media data stored in the second memory are media data fragment(s) that can be separately retrieved from the second memory, the metadata stored in memory may comprise a list of fragments that are stored in the second memory. Such list of fragments may be updated as one or more fragments are newly stored in the second memory and as one or more fragments are removed from the second memory. The list of fragments stored in the second memory may advantageously be used to determine whether metadata needed for serving the received request are related to fragments stored in the second memory, and to identify, as the case may be, one or more fragments stored in the second memory which are related to metadata needed to serve the received request. Metadata related to such fragments may then be retrieved from a memory (e.g. from the second memory) in which they are stored, and processed in order to generate the requested metadata.

Chunk metadata related to chunk stored in the first memory and fragment metadata related to fragment stored in the second memory retrieved from memory for serving the request may then be processed, including combined, in order to generate the requested metadata in the prescribed format. For example, the chunk metadata and the fragment metadata may be used to generate a requested manifest.

In one or more embodiments, the second determination may be based on the first determination. For example, metadata needed to serve the request identified as related to media data stored in the first search memory per the first determination may be used to update metadata needed to serve the request so as to streamline the second determination.

In some embodiments, the descriptor may correspond to media data, for example expressed in one or more media data units addressable by a request for media data to be generated in order to serve the request. Such may typically be the case when the request related to media data is a request for media data, such as, for example, a request for one or more media objects addressable by a request for media data. For example, in embodiments where media objects addressable by a request may be media data chunks and/or media segments, the request for media data may be a request for one or more media data chunks and/or for one or more media segments. For example, in embodiments using the CMAF format, the request for media data may be a request for one or more CMAF chunks and/or one or more CMAF segments.

In such embodiments, the media distribution unit may be configured for performing a first determination as to whether the media data to be generated comprises data stored in a first search memory. The first determination may advantageously be used to identify, in a first search memory which may be the first memory or the second memory, data that is related to the media data to be generated in order to serve the request, and which is stored in the first search memory. Based on the first determination, first search data comprising media data stored in the first search memory may be retrieved from the first search memory.

Depending on the embodiments, the search for media data relevant for serving the request may first be conducted in the first memory or in the second memory.

That is, in some embodiments, the first search memory may be the first memory, the data stored in the first search memory may comprise one or more media data chunks of the media stream stored in the first memory, the first search data may comprise one or more chunks of the media stream stored in the first memory, and the first search data may be comprised in the first data In other embodiments, the first search memory may be the second memory, the data stored in the first search memory may comprise one or more media data fragments of the media stream stored in the second memory, the first search data may comprise one or more fragments of the media stream stored in the second memory, and the first search data may be comprised in the second data.

In some embodiments, further to retrieving relevant media data in the first search memory, the media distribution unit may be configured to retrieve relevant media data from a second search memory, which will be the second memory in the case where the first search memory is the first memory, or else the first memory in the case where the first search memory is the second memory. That is, in some embodiments, first search data comprising media data relevant for serving the request may be retrieved from a first search memory, which may be the first (respectively second) memory, and second search data comprising media data relevant for serving the request may be retrieved from a second search memory, which may be the second (respectively first) memory.

In order to do so, the media distribution unit may in some embodiments be configured for determining whether or not at least part of the media data to be generated is not stored in the first search memory.

The media distribution unit may further be configured for, upon determining that at least part of the media data to be generated is not stored in the first search memory, performing a second determination, based on the first determination, of second search data stored in a second search memory which is comprised in the media data to be generated. The second determination may therefore advantageously be used to identify, in the second search memory which may be, depending on whether the first search memory is the first memory or the second memory, respectively the second memory or the first memory, media data which is related to the media data to be generated and which is stored in the second search memory. Based on the second determination, second search data comprising identified media data stored in the second search memory may be retrieved from the second search memory.

As discussed above, depending on the embodiments, the search for media data relevant for serving the request may first be conducted in the first memory or in the second memory, or may be conducted in parallel in the first and second memory. Further to being conducted in the first search memory, which may be the first memory or the second memory, the search for media data relevant for serving the request may further be conducted in the second memory (if the first search memory was the first memory) or in the first memory (if the first search memory was the second memory). In some embodiments, the search in the first search memory and the search in the second memory may be conducted in parallel, so that the search for relevant media data to serve the request may be conducted in parallel in the first and second memories.

That is, in some embodiments where the first search memory is the second memory, the second search memory may be the first memory, the second search data stored in the second search memory may comprise one or more media data chunks of the media stream stored in the first memory, and the second search data may be comprised in the first data. Further, in some embodiments where the first search memory is the first memory, the second search memory may be the second memory, the second search data stored in the second search memory may comprise one or more media data fragments of the media stream stored in the second memory, and the second search data may be comprised in the second data.

Therefore, in some embodiments, media data may advantageously be retrieved from both the first and second memories of the media distribution unit in order to serve a received request related to media data, for example a request for media data (e.g. a request for one or more media data chunks and/or one or more media data fragments).

In one or more embodiments, metadata related to media data stored in the first memory may be stored in the first (or second) memory. As media data stored in the first memory are media data chunk(s) that can be separately retrieved from the first memory, the metadata stored in memory may comprise a list of chunks that are stored in the first memory. Such list of chunks may be updated as one or more chunks are newly stored in the first memory and as one or more chunks are removed from the first memory. The list of chunks stored in the first memory may advantageously be used to determine whether media data chunks needed for serving the received request are stored in the first memory, and to identify, as the case may be, one or more chunks stored in the first memory which are needed to serve the received request. The one or more chunks may then be retrieved from the first memory in which they are stored, and processed in order to generate the requested media data.

Likewise, in one or more embodiments, metadata related to media data stored in the second memory may be stored in the second (or first) memory. As media data stored in the second memory are media data fragment(s) that can be separately retrieved from the second memory, the metadata stored in memory may comprise a list of fragments that are stored in the second memory. Such list of fragments may be updated as one or more fragments are newly stored in the second memory and as one or more fragments are removed from the second memory. The list of fragments stored in the second memory may advantageously be used to determine whether media data fragments needed for serving the received request are stored in the second memory, and to identify, as the case may be, one or more fragments stored in the second memory which are needed to serve the received request. The one of more fragments may then be retrieved from the second memory in which they are stored, and processed in order to generate the requested media data.

Chunk(s) retrieved from the first memory and/or fragment(s) retrieved from the second memory in order to serve the request may then be processed. The processing of retrieved metadata may include, depending on the received request, combining chunks, fragments, and/or chunks and fragments in order to generate the requested media data in the prescribed format. The processing of retrieved metadata may also include extracting one or more chunks from retrieved fragments in order to serve a request for chunks.

Depending on the embodiment, the retrieval of media data from the first and second memories may be performed at least partially sequentially and/or at least partially concurrently. As a consequence, the search of data in one memory may, depending on the embodiment, may or may not, fully or partially, be based on results of the search of data in the other memory. The present disclosure is not limited to any specific order of search between the first and second memories, or to the use of results of search in one memory in the search in the other memory.

The retrieval of media data from two distinct memories may lead to retrieve the same data in the two memories. The proposed method may advantageously address this situation through removal of redundant data from the retrieved data which is used for generating media data to serve the received request. In one or more embodiments, the proposed method may comprise: removing redundant data from combined data based on data retrieved from the first memory and data retrieved from the second memory in order to generate the media data in order to serve the request.

Depending on the embodiment, the descriptor of the data to be generated may comprise a type of data and/or a time position of media data which is requested. For example, the descriptor may be carried by a URL contained in the request for media data, e.g. for a segment, which may contain an identifier of the track corresponding to the requested segment, and time information related to the segment to be generated.

Figure 4C:
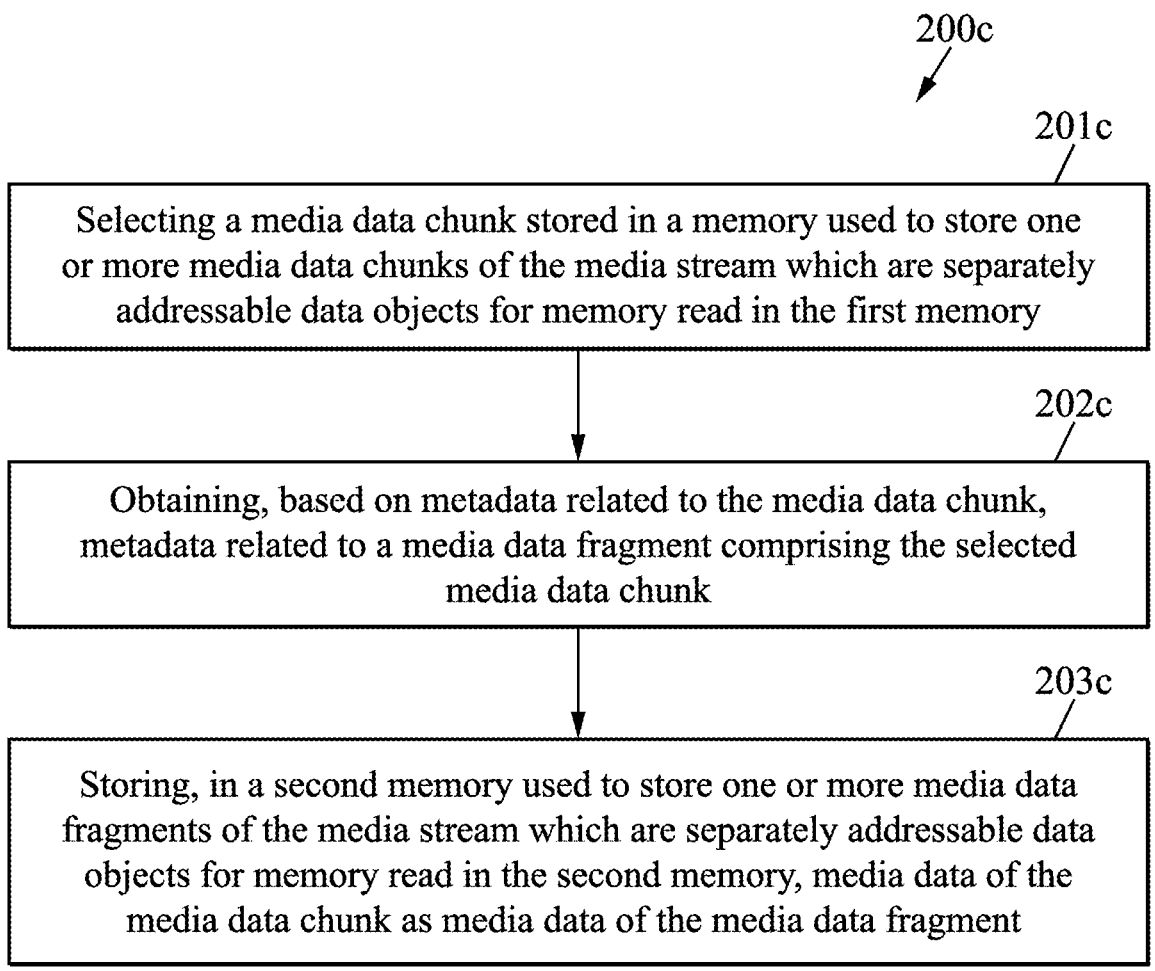
FIG. 4*c* illustrates an exemplary method of processing media streams for managing stored media data in accordance with one or more embodiments.

FIG. 4c illustrates an exemplary method 200c for processing a media (e.g. video) stream for managing stored media data according to one or more embodiments of the present subject disclosure. FIG. 4c illustrates operations that may preferably be carried out at a media distribution unit, such as a packager unit as illustrated on FIG. 2, configured for implementing one or more embodiments of the proposed methods.

Such a media distribution unit may comprise a processor and first and second memories for storing media data. The first memory (for example the LL DB memory 1041 shown on FIG. 2) may be used (and may therefore be configured for streams that support low latency) to store one or more media data chunks of the media stream which are separately addressable media data objects for memory read in the first memory, and the second memory (for example the Live DB memory 1042 shown on FIG. 2) may be used (and may therefore be configured for various types of streams, including streams that do not support low latency) to store one or more media data fragments of the media stream which are separately addressable media data objects for memory read in the second memory, the one or more media data fragments respectively comprising one or mode media data chunks.

Referring to FIG. 4c, one or more media data chunks stored in the first memory may be selected (201c).

In one or more embodiments, the selected media data chunks stored in the first memory may be chosen based on metadata related thereto that indicate that the one or more media data chunks belong to one media data fragment. For example, one or more media data chunks stored in the first memory may be selected on the basis that they constitute all the chunks that belong to a given fragment.

Further to selecting the one or more media data chunks, metadata related to a media data fragment comprising the selected media data chunk(s) may be obtained (202c) based on metadata related to the media data chunk(s).

Depending on the embodiment, metadata related to the media data fragment may be determined or generated based on metadata related to the chunk(s), or such metadata may have been received as part of metadata comprised in the received media stream.

Once metadata related to the media data fragment have been obtained, media data of the media data chunk may be stored (203c) in the second memory as media data of the media data fragment.

In one or more embodiments, the media data fragment corresponding to the selected media data chunk(s) may be generated before being stored in the second memory.

In other embodiments, the media data of the selected chunks that are stored in the first memory may be copied in the second memory, and metadata describing the fragment newly stored in the second memory may be generated, and used for managing the fragment media data stored in the second memory. In such cases, it may not be necessary to generate per se the media data fragment, but merely to retrieve from the media data of the selected chunks stored in the first memory the media data of the fragment and store such media data in the second memory. For example, the media data of the selected chunks stored in the first memory may be, depending on the embodiment, moved or copied from the first memory to the second memory and identified in the second memory as the media data of the fragment stored in the second memory.

In one or more embodiments, the chunk(s) selected in the first memory may have been stored with a chunk granularity in the first memory based on a received media stream which supports low latency. Depending on the embodiment, the media distribution unit may receive a media stream which supports low latency that is already divided into media data chunks and corresponding metadata describing the segmentation into chunks, or may perform the segmentation of the received media stream into media data chunks, and generate corresponding metadata describing the segmentation into chunks. Each media data chunk that is obtained from the received media data and the corresponding metadata may then be stored in the first memory, before being used for example for serving a request for media data received by the media distribution unit. The proposed method for storing in the second memory chunk media data stored in the first memory may therefore further comprise the obtaining, based on received media stream data, at least one media data chunk of the media stream, wherein the at least one media data chunk is a separately addressable data unit by a request for media data received by the media distribution unit, and storing the media data chunk in the first memory of the media distribution unit.

As discussed above, depending on the embodiment, metadata related to a media data chunk comprised in the received media stream that supports low latency, including metadata describing the position of the chunk in a segmentation into chunks of the media stream, may be obtained by the media distribution unit based on received media stream data, by extracting such metadata from received media stream data and/or by generating such metadata based on received media stream data.

For example, in one or more embodiments, received media stream data may comprise a sequence of media data chunks and metadata related to chunks of the sequence, each media data chunk belonging to a fragment in a sequence of fragments comprised in the media stream data, and the metadata related to the media data chunk comprise information as to whether or not the media data chunk is the first chunk of a fragment. The received media stream may for example support CMAF low latency, and be segmented into CMAF chunks and comprise CMAF metadata such as described above and illustrated on FIG. 3.

As a further example, the metadata related to the media data chunk may in some embodiments comprise a timestamp associated with the media data chunk, and data representing a duration of the media data chunk. The timestamp data may for example indicate a time associated to the media data chunk according to a time source. In some embodiments, metadata related to the media data fragment may be determined at the media distribution unit, based on the timestamp associated with the first media data chunk of the media data fragment, and based on the metadata related to the duration of each chunks belonging to the media data fragment. For example, metadata related to the duration of the media data fragment may be determined by combining the metadata related to duration corresponding to each of the chunks belonging to the fragment. Further, a timestamp related to the media data fragment may be determined based on the timestamp related to the first media data chunk of the media data fragment in the sequence of media data chunks that constitute the media data of the fragment.

In one or more embodiments, the chunks received by the media distribution unit may constitute a sequence of chunks that follow each other in time according to a time source. Metadata related to each chunk, such as a timestamp, may be used to determine a position of each chunk in the sequence.

In one or more embodiments, the metadata related to a media data chunk may comprise information on a media data fragment to which the media data chunk belongs. Such metadata may advantageously be used to reconstitute a media data fragment and/or metadata related to the fragment based on metadata related to the chunks comprised in the fragment.

For example, in some embodiments, the media distribution unit may be configured to parse (for example continuously, periodically or upon expiry of a timer) the metadata of chunks stored in the first memory to identify a (first) chunk the metadata of which indicates that it starts a new (first) fragment. Once a chunk that starts a new fragment is identified, metadata related to this new fragment may be generated based on parsing a sequence of chunks stored in the first memory to identify a next chunk in the sequence the metadata of which indicates that it starts a new (second) fragment. Based on the identification of a second chunk in the sequence which starts a new (second) fragment, the chunks of the sequence positioned in between the first chunk in the sequence which starts a new (first) fragment and the second chunk in the sequence which starts a new (second) fragment, may be identified, together with the first chunk in the sequence which starts a new (first) fragment, as belonging to the (first) fragment. Metadata related to a fragment may therefore be generated based on identifying among chunks stored in the first memory the chunk that starts the fragment and, as the case may be, one or more chunks that follow such first chunk and belong to the same fragment as they don't start a new fragment.

For example, in one or more embodiments, iterations of a loop may be performed, each iteration comprising the parsing of metadata related to a received sequence of chunks to identify a chunk with starts a new fragment as well as possibly one or more following chunks in the sequence that do not start a new fragment and can therefore be identified as belonging to the same fragment as the chunk which starts the fragment.

As discussed above, a fragment may comprise one or several chunks. Therefore, in cases where the storing into the second memory of a current chunk stored into the first memory involves the storing into the second memory of a fragment that contains other chunks besides the current chunk, the proposed method may comprise the selecting of a plurality of media data chunks stored in the first memory, and the generating the metadata related to the media data fragment based on metadata related to each of the selected media data chunks.

In other cases where the storing into the second memory of a current chunk stored into the first memory involves the storing into the second memory of a fragment that contains only the current chunk, the proposed method may comprise the selecting of the current media data chunk stored in the first memory, and the generating the metadata related to the media data fragment based only on metadata related to the selected media data chunk In one or more embodiments, the management of the first memory (e.g. by a control unit of the media distribution unit) may comprise management of data stored in the first memory so that the storage capacity of the first memory is not overflown, potentially leading to data loss. As part of such management, media data chunks may not be kept in the first memory beyond a predetermined time period, which may be defined based on a timer using a predefined time source (e.g. time source synchronized on a local clock of the media distribution unit or time source synchronized on the media stream) as described above. The media distribution unit may be configured for performing the proposed method for storing in the second memory a media data chunk stored in the first memory based on a fragment to which the media data chunk belongs upon expiration of the timer. The media distribution unit may further be configured to delete a media data chunk from the first memory once a media data fragment comprising the media data chunk is stored in the second memory. Such a combined management of the first and second memories may advantageously increase the data storage security provided by the proposed methods. For example, data loss may advantageously be avoided by configuring the media distribution unit to delete a media data chunk from the first memory only once a determination that a media data fragment comprising the media data chunk is stored in the second memory has been made, indicating that the storage of the chunk in the second memory is complete.

In one or more embodiments, a list of chunks stored in the first memory may be maintained according to chunks newly stored in the first memory, and chunks deleted from the first memory. This list of chunks may advantageously be used to manage the first memory and/or to use the first memory, for example to serve requests for chunks that may be received by the media distribution unit. In some embodiments, the list of media data chunks stored in the first memory may be updated upon deletion of the media data chunk from the first memory, based on the media data chunk.

Figure 5:
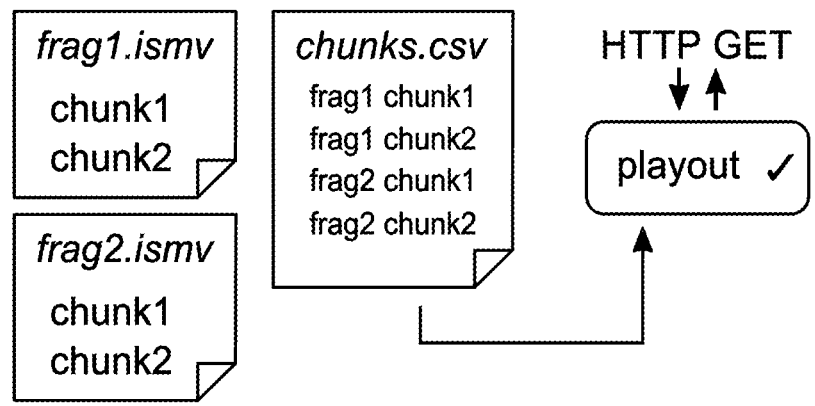
FIG. 5 illustrates an exemplary method for processing video streams in accordance with one or more embodiments.

FIG. 5 illustrates a method of processing a video stream for storing media data chunks according to one or more embodiments.

As shown on FIG. 5, upon receipt of CMAF media data chunks by a media distribution unit, such as a packager, the chunks may be written into fragment files respectively corresponding to the CMAF fragment to which they belong.

In the example illustrated on FIG. 5, two fragment files, for example two MP4 format files (e.g. using an ismv extension) are created ("frag1.ismv" and "frag2.ismv") each holding two chunks. Assuming that two CMAF fragments are received, each comprising two CMAF chunks, a first fragment file (frag1.ismv) is created to hold the two chunks ("chunk1" and "chunk2") of the CMAF fragment to which it corresponds, while a second fragment file (frag2.ismv) is created to also hold the two chunks ("chunk1" and "chunk2") of the CMAF fragment to which it corresponds. The two fragment files are stored in a so-called "low-latency" memory (or "LL memory") of the media distribution unit (such as the LL DB memory (1041) illustrated on FIG. 2) which is used to store one or more media data chunks of the media stream which are separately addressable data units for memory read in the LL memory, and which is preferably local to the media distribution unit.

In one or more embodiments, a list of chunk file(s), for example in the form of a csv (comma-separated values) file format (or any other suitable file format, such as a text file format) file "chunks.csv", is then updated with data related to the two fragment files frag1.ismv and frag2.ismv. As illustrated on FIG. 5, the chunk list file "chunks.csv" may include a list of chunks in association with the respective fragment to which they belong: chunk 1 belonging to fragment 1, chunk 2 belonging to fragment 1, chunk 1 belonging to fragment 2, and chunk 2 belonging to fragment 2.

In one or more embodiments, the update of the chunk list "chunks.csv" may in turn trigger an event in the form of a message transmitted to an output interface unit of the media distribution unit, such as the playout unit (1043) of the packager (104) illustrated on FIG. 2.

Depending on the embodiment, the message transmitted to the output interface unit may comprise an updated chunk list, or may indicate to the output interface unit that the chunk list has been updated. In the latter case, the output interface unit may be configured to determine, upon receipt of the event or message, that the chunk list has been updated, and further to this determination to query the updated chunk list in LL memory in order to determine whether or not new chunks that may be needed to serve received requests are stored in the LL memory.

The output interface unit may be configured for receiving, from CDN networks and/or media players, HTTP GET requests for media data. For example, in media distribution systems supporting chunked transfer encoding (sometimes referred to as chunked transfer) defined for HTTP, the HTTP request for media data may be directed to one or more HTTP chunks (through a HTTP header "Transfer-Encoding" field set to "chunked"), and be served as a request for media data at the CMAF chunk granularity.

The output interface unit may also advantageously support chunk transfer, and may be configured to hold on a request for a chunk until the requested chunk is listed in an updated chunk list for which an event has been received. Upon receipt of the event, the playout may serve the request by retrieving the chunk in the LL memory based on the chunk list file, and by sending the chunk to the entity from which the request was received.

Figure 6:
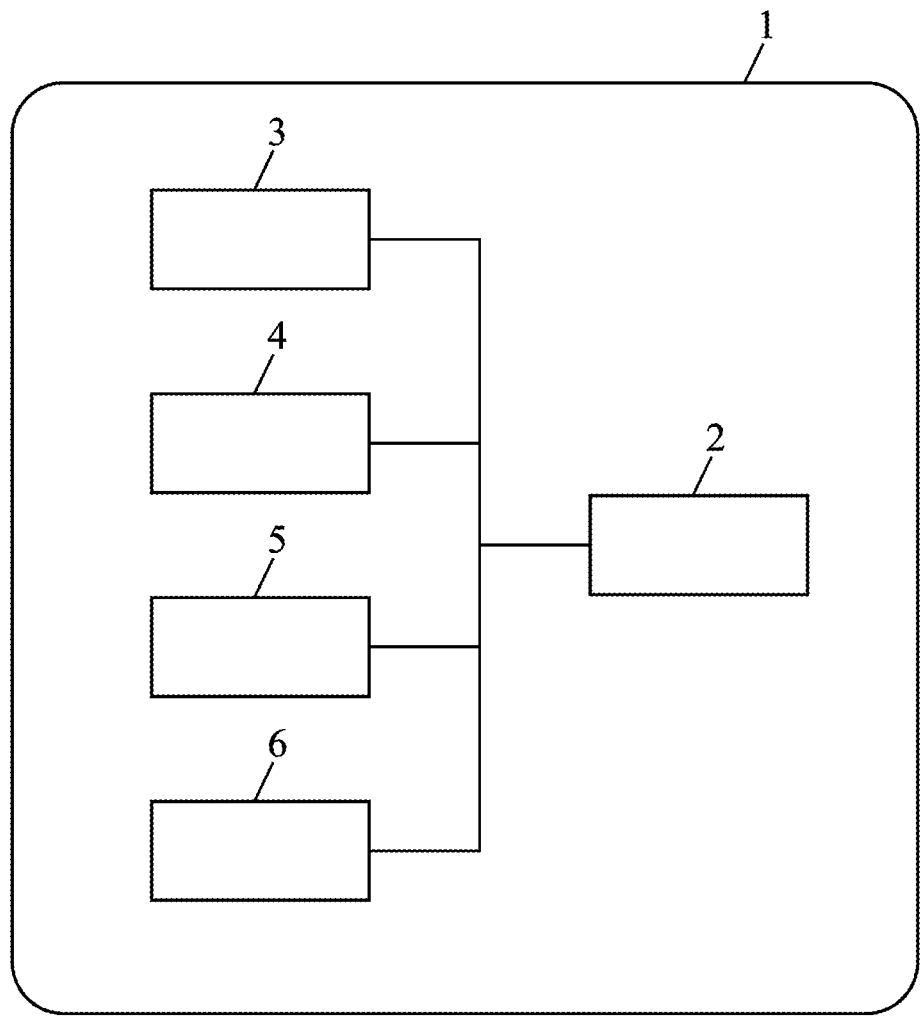
FIG. 6 is a block diagram of an exemplary video distribution apparatus in accordance with one or more embodiments.

FIG. 6 illustrates an exemplary apparatus or unit 1 configured to serve as a video distribution unit, for example a video packager, in accordance with embodiments of the present subject disclosure.

The apparatus 1, which may comprise one or more computers, includes a control engine 2, an input interface engine 3, an output interface engine 4, a video processing engine 5, a first memory 6 and a second memory 7.

In the architecture illustrated on FIG. 6, all of the input interface engine 3, output interface engine 4, video processing engine 5, and memory 6 are operatively coupled with one another through the control engine 2.

In some embodiments, the video processing engine 5 is configured to perform various aspects of embodiments of one or more of the proposed methods for processing video streams as described herein, such as without limitation related to processing video streams received by the input interface engine 3, including managing the storing of received chunks into the memory 6, and managing the list of chunks stored in the memory 6.

In some embodiments, the input interface engine 3 is configured to perform various aspects of embodiments of one or more of the proposed methods for processing video streams as described herein, such as without limitation related to receiving encoded video streams to be processed as described herein.

In some embodiments, the output interface engine 4 is configured to perform various aspects of embodiments of one or more of the proposed methods for processing video streams as described herein, such as without limitation related to handling of event related to a list of chunks stored in the memory, handling of requests for media data, and interfacing with media distribution entities downstream the media distribution chain from the media distribution unit.

In some embodiments, the multiplexing engine 6 is configured to perform various aspects of embodiments of one or more of the proposed methods for remote monitoring as described herein, such as without limitation related to multiplexing a plurality of thumbnails generated based on video streams to be monitored and generating one or more mosaic streams based on multiplexed thumbnails.

The control engine 2 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers used for implementing the proposed methods can be configured as a multi-processor computer having multiple processors for providing parallel computing. The control engine 2 may also comprise, or may be in communication with, computer storage media, such as, without limitation, the memory 6, capable of storing computer program instructions or software code that, when executed by the processor, causes the processor to perform various acts of the methods described herein. In addition, the memory 6 may be any type of data storage computer storage medium, capable of storing a data structure representing a computer network to which the apparatus 1 belongs, coupled to the control engine 2 and operable with the input interface engine 3, output interface engine 4, and video processing engine 5 to facilitate management and processing of data stored in association therewith.

It will be appreciated that the apparatus 1 shown and described with reference to FIG. 6 is provided by way of example only. Numerous other architectures, operating environments, and configurations are possible. Other embodiments of the apparatus may include fewer or greater number of components and may incorporate some or all of the functionality described with respect to the apparatus components shown in FIG. 6. Accordingly, although the control engine 2, input interface engine 3, output interface engine 4, video processing engine 5, and memory 6 are illustrated as part of the apparatus 1, no restrictions are placed on the location and control of components 2-6. In particular, in other embodiments, components 2-6 may be part of different entities, servers, or computing systems.

While the disclosure has been described with respect to preferred embodiments, those skilled in the art will readily appreciate that various changes and/or modifications can be made to the disclosure without departing from the spirit or scope of the present subject-disclosure as defined by the appended claims.

Although this disclosure has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the disclosure. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A method for processing a media stream, performed by a multimedia content packaging apparatus that includes a processor and is configured to package multimedia content, the method comprising:
    obtaining, based on media stream data received from a media encoder, at least one media data chunk of the media stream as a separately addressable media data object by a media data request received at the packaging apparatus, the at least one media data chunk being comprised in a media data fragment of the media stream;

generating, based on the received media stream data, metadata related to the media data chunk, the metadata comprising
information on the media data fragment to which the media data chunk belongs, and
a timestamp for the media data chunk;

storing the media data chunk in a memory of the packaging apparatus in the form of a fragment file containing the media data chunk, based on the information on the media data fragment to which the media data chunk belongs indicating that the media data chunk is a first chunk of the media data fragment, the memory being configured to store media data chunks as separately addressable media data objects for a memory read from the memory;

determining, based on the timestamp, whether the media data fragment was stored in the memory for a time period exceeding a predetermined duration;

deleting from the memory each of one or more media data chunks belonging to the media data fragment, based on the determining whether the media data fragment was stored in the memory for the time period exceeding the predetermined duration;

updating a list of media data chunks stored in the memory, based on the metadata related to the media data chunk; and updating the list of media data chunks by deleting from the list metadata related to each of the one or more media data chunks belonging to the media data fragment.

2. The method according to claim 1, further comprising: generating, by the packaging apparatus, the at least one media data chunk based on the media stream data.

3. The method according to claim 1, further comprising: based on the information on the media data fragment not indicating that the media data chunk is the first chunk of the media data fragment, storing the media data chunk in the memory in the fragment file corresponding to the media data fragment.

4. The method according to claim 1, further comprising: determining, based on the timestamp, whether the media data chunk was stored in the memory for a time period exceeding a predetermined duration; and
based on the determination, deleting the media data chunk from the memory, and updating the list of media data chunks by deleting from the list the metadata related to the media data chunk.

5. The method according to claim 1, further comprising: receiving a request for transmission of the media data chunk from an output of the packaging apparatus configured to output media data in response to a request related to media data received by the packaging apparatus.

6. The method according to claim 1, further comprising: further to updating the list, transmitting to an output of the packaging apparatus a message informing the output that the media data chunk is stored in the memory.

7. The method according to claim 1, wherein the media data chunk is a Common Media Application Format (CMAF) chunk.

8. The method according to claim 1, wherein the memory is a short-term memory, wherein the short-term memory is dimensioned to store media data corresponding to a predetermined capacity feature.

9. The method according to claim 1, wherein the memory is a Random Access Memory (RAM) and/or a flash-based memory.

10. A multimedia content packaging apparatus configured to process a media stream, the multimedia content packaging apparatus comprising:
a memory; and
a processor operatively coupled to the memory, the processor being configured to:
obtain, based on media stream data received from a media encoder, at least one media data chunk of the media stream as a separately addressable media data object by a media data request received at the packaging apparatus, the at least one media data chunk being comprised in a media data fragment of the media stream,
generate, based on the received media stream data, metadata related to the media data chunk, the metadata comprising
information on the media data fragment to which the media data chunk belongs, and
a timestamp for the media data chunk,
store the media data chunk in a memory of the packaging apparatus in the form of a fragment file containing the media data chunk, based on the information on the media data fragment to which the media data chunk belongs indicating that the media data chunk is a first chunk of the media data fragment, the memory being configured to store media data chunks as separately addressable media data objects for a memory read from the memory,
determine, based on the timestamp, whether the media data fragment was stored in the memory for a time period exceeding a predetermined duration,
delete from the memory each of one or more media data chunks belonging to the media data fragment, based on the determining whether the media data fragment was stored in the memory for the time period exceeding the predetermined duration,
update a list of media data chunks stored in the memory, based on the metadata related to the media data chunk, and
update the list of media data chunks by deleting from the list metadata related to each of the one or more media data chunks belonging to the media data fragment.

11. A media distribution system configured to distribute media streams, the media distributing system comprising the multimedia content packaging apparatus according to claim 10 configured to process video streams received by the system.

12. The apparatus of claim 10, wherein the processor is configured to generate, by the packaging apparatus, the at least one media data chunk based on the media stream data.

13. The apparatus of claim 10, wherein the processor of the packaging apparatus is further configured to:
based on the information on the media data fragment not indicating that the media data chunk is the first chunk of the media data fragment, store the media data chunk in the memory in the fragment file corresponding to the media data fragment.

14. A non-transitory computer-readable medium encoded with executable instructions which, when executed, causes a multimedia content packaging apparatus, equipped with a processor operatively coupled with a memory, to perform functions for processing a media stream, said functions comprising:

obtaining, based on media stream data received from a media encoder, at least one media data chunk of the media stream, as a separately addressable media data object by a media data request received at the packaging apparatus, the at least one media data chunk being comprised in a media data fragment of the media stream;

generating, based on the received media stream data, metadata related to the media data chunk, the metadata comprising information on the media data fragment to which the media data chunk belongs, and a timestamp for the media data chunk;

storing the media data chunk in a memory of the packaging apparatus in the form of a fragment file containing the media data chunk, based on the information on the media data fragment to which the media data chunk belongs indicating that the media data chunk is a first chunk of the media data fragment, the memory being configured to store media data chunks as separately addressable media data objects for a memory read from the memory;

determining, based on the timestamp, whether the media data fragment was stored in the memory for a time period exceeding a predetermined duration;

deleting from the memory each of one or more media data chunks belonging to the media data fragment, based on the determining whether the media data fragment was stored in the memory for the time period exceeding the predetermined duration;

updating a list of media data chunks stored in the memory, based on the metadata related to the media data chunk; and updating the list of media data chunks by deleting from the list metadata related to each of the one or more media data chunks belonging to the media data fragment.

15. The non-transitory computer-readable medium of claim 14, wherein functions further comprise:

generating, by the packaging apparatus, the at least one media data chunk based on the media stream data.

16. The non-transitory computer-readable medium of claim 14, wherein the functions further comprise:

based on the information on the media data fragment not indicating that the media data chunk is the first chunk of the media data fragment, storing the media data chunk in the memory in the fragment file corresponding to the media data fragment.

* * * * *